(12) United States Patent
Daley et al.

(10) Patent No.: US 11,748,718 B1
(45) Date of Patent: Sep. 5, 2023

(54) GRAPHICAL USER INTERFACES FOR CONSOLIDATED ACCOUNT CREATION AND ACCOUNT FUNDING IN DIGITAL SYSTEMS

(71) Applicant: Chime Financial, Inc., San Francisco, CA (US)

(72) Inventors: Kyle Patrick Daley, Incline Village, NV (US); Jonathan Carter Fulton, Oakland, CA (US); Kevin Kang Chen, Austin, TX (US); Spencer Alexander Bell, San Francisco, CA (US)

(73) Assignee: Chime Financial, Inc., San Francisco, CA (US)

( * ) Notice: Subject to any disclaimer, the term of this patent is extended or adjusted under 35 U.S.C. 154(b) by 0 days.

(21) Appl. No.: 17/655,951

(22) Filed: Mar. 22, 2022

(51) Int. Cl.
*G06Q 20/10* (2012.01)
*G06F 3/0482* (2013.01)

(52) U.S. Cl.
CPC ........... *G06Q 20/10* (2013.01); *G06F 3/0482* (2013.01)

(58) Field of Classification Search
USPC .................................................... 705/35, 39
See application file for complete search history.

(56) References Cited

U.S. PATENT DOCUMENTS

| 2016/0267447 A1* | 9/2016 | Davis | G06Q 20/10 |
| 2017/0004475 A1* | 1/2017 | White | G07G 1/0036 |
| 2017/0178091 A1* | 6/2017 | Sarin | G06Q 20/105 |

FOREIGN PATENT DOCUMENTS

| EP | 2226768 A1 * | 9/2010 | G07D 1/02 |

* cited by examiner

Primary Examiner — William E Rankins
(74) Attorney, Agent, or Firm — Keller Preece PLLC

(57) ABSTRACT

The present disclosure relates to method, systems, and non-transitory computer-readable media for building accounts of a digital system using one or more improved graphical user interfaces. For example, in one or more embodiments, the disclosed systems provide a consolidated graphical user interface for applying for multiple user accounts simultaneously utilizing application information received via an enrollment workflow. In some cases, upon application to the multiple accounts, the disclosed system creates at least one account and puts a hold on at least one other account until one or more additional requirements are met. Further, the disclosed systems can provide a graphical user interface that facilitates funding of an account by, for example, supplying options corresponding to suggested transfer amounts determined from user account characteristics. In some cases, the disclosed systems provide a visual animation of transferring funds between accounts, thereby efficiently communicating the funding and how the transfer affects such accounts.

20 Claims, 19 Drawing Sheets

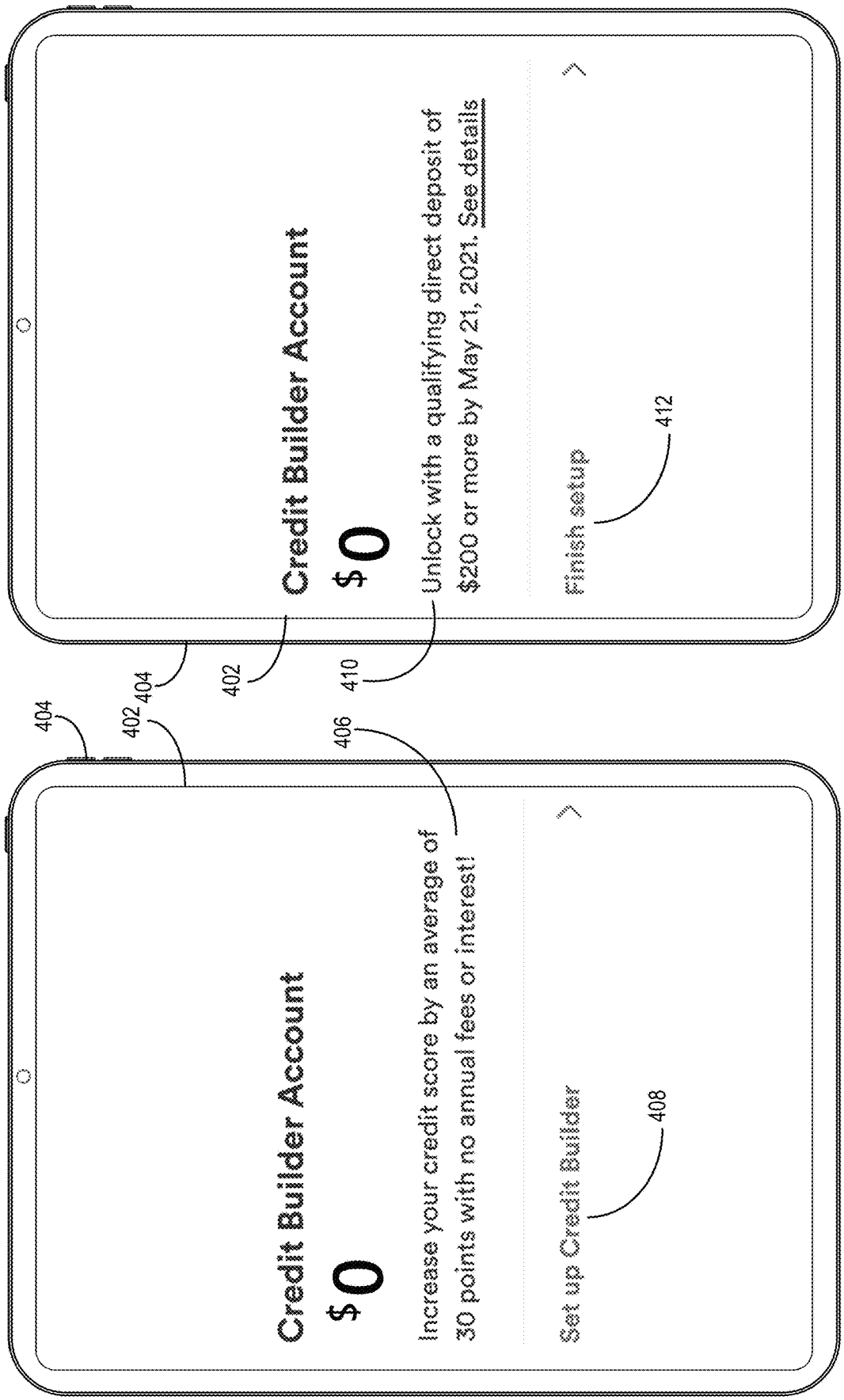

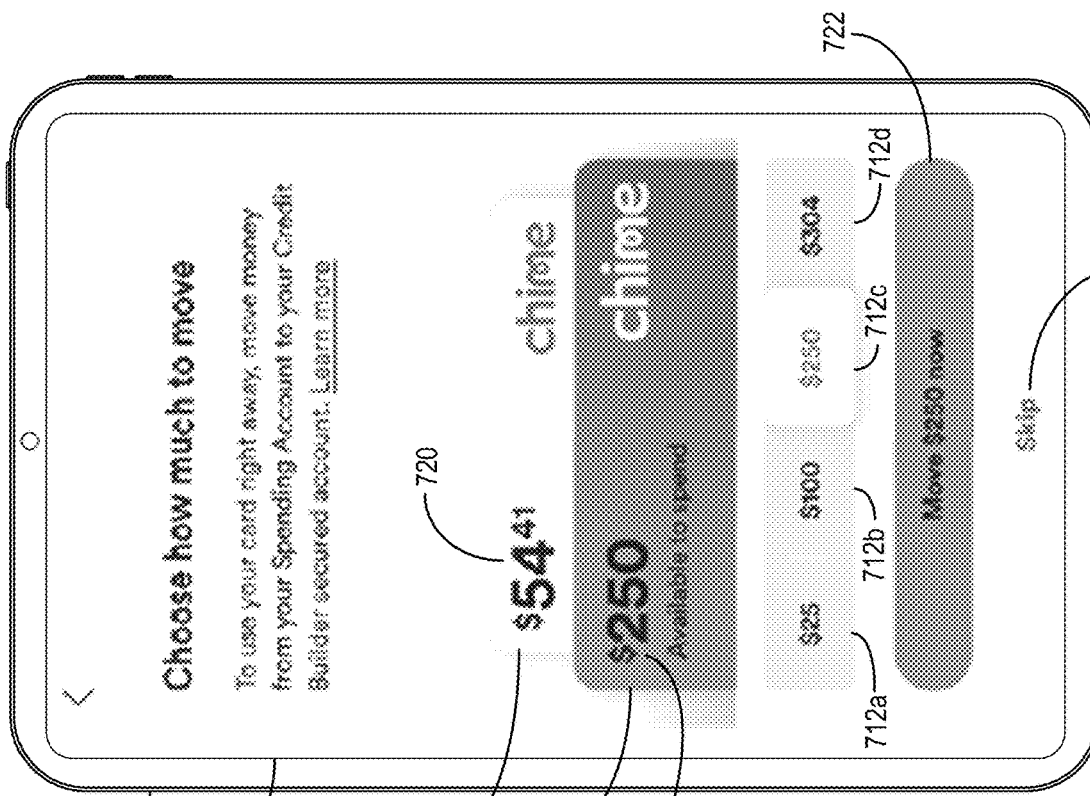
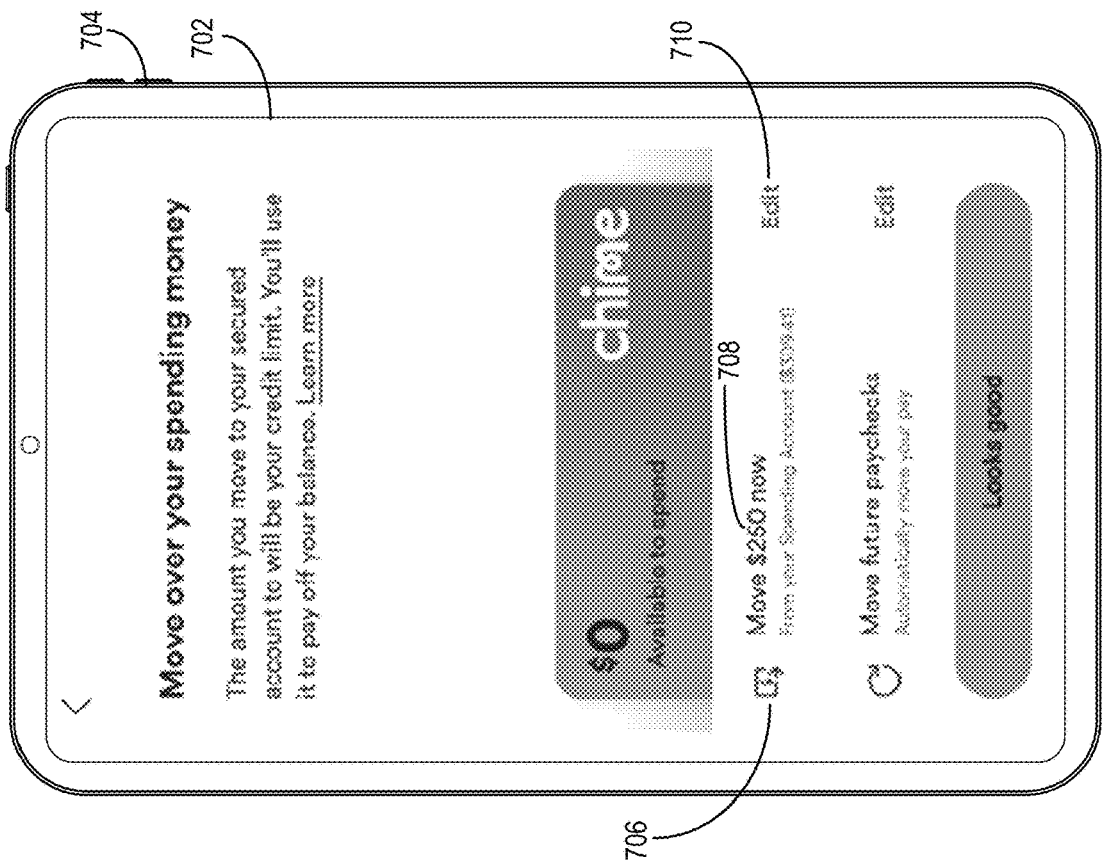
*Fig. 7B*
*Fig. 7A*

GRAPHICAL USER INTERFACES FOR CONSOLIDATED ACCOUNT CREATION AND ACCOUNT FUNDING IN DIGITAL SYSTEMS

BACKGROUND

Recent years have seen significant advancement in hardware and software platforms that implement digital systems that provide various digital services to computing devices. Indeed, as digital systems have become increasingly available and sophisticated, the digital services offered by these digital systems and their associated benefits have grown in number, variety, and complexity. Many existing systems facilitate the creation and use of accounts that are associated with computing devices. Through the accounts, the computing devices can interact with the digital systems by, for example, setting preferences, utilizing features, and managing assets held by the accounts. Thus, in many cases, a digital system offers its digital services to those computing devices associated with at least one account of the digital system.

Despite these advances, however, conventional network transaction systems suffer from several technological shortcomings that result in inefficiencies and security failings. For instance, many conventional network transaction systems implement inefficient processes for creating and funding (e.g., transferring assets to) accounts. To illustrate, many digital systems offer a variety of account types where each account type provides access to a different set of features and/or services. Such systems, however, often implement separate application processes—and separate series of graphical user interfaces—for each account. In some cases, client devices tediously navigate through isolated series of graphical user interfaces to repeatedly input the same (or similar) information for different account types. Thus, these systems typically require a significant amount of user interactions with a computing device to input and submit the information needed to apply for multiple accounts. Some systems may further require completion of one or more activities to qualify for a particular account but only provide options for completing the activities separately from the application process.

Similarly, conventional network transaction systems typically implement inefficient processes for funding existing accounts. For example, conventional systems often require a significant amount of user interactions with a computing device to meticulously control the funding process (e.g., which assets to transfer to the account and/or the quantity of assets to be transferred). In some such cases, for instance, conventional systems present client devices with individual fields for specific funding amounts, dates, recurring transfer options, account numbers, routing numbers, and other details that must be individually entered by a user. To further elongate and complicate a funding process between accounts, in some cases, conventional systems send token amounts to a linked account—requiring separate login and verification protocols through graphical user interfaces of email accounts and financial institutions (or other different software applications)—to authorize a link or funding of accounts.

In addition to the flexibility problems described above, conventional network transaction systems often suffer from network security concerns. For instance, many conventional network transaction systems require the submission of private security information (e.g., a social security number) when applying for an account and utilizes such information to verify the identity of the corresponding user (e.g., by submitting requests to third-party verifiers). As many systems implement separate application processes for different accounts, computing devices must transmit the private security information multiple times over a network when applying for multiple accounts, and the systems hold on to the secure information for a longer period of time. This problem becomes exacerbated when a system does not meet certain regulatory requirements or industry security standards for holding onto private security information for longer than a threshold period of time.

These, along with additional problems and issues, exist with regard to conventional network transaction systems.

SUMMARY

This disclosure describes one or more embodiments of methods, non-transitory computer-readable media, and systems that solve one or more of the foregoing problems and provide other benefits. For example, in one or more embodiments, the disclosed systems facilitate the pre-ordering of one account of a digital system in conjunction with the application for another account of the digital system. To illustrate, in some implementations, the disclosed systems provide a graphical user interface having options to apply for multiple accounts of a digital system simultaneously. In response to selection of the options, the disclosed systems can create one of the accounts while postponing creation of the other account until one or more pre-requisite activities have been completed. After creation of the other account, in some embodiments, the disclosed system can provide dynamic, pre-populated options for funding the account (e.g., transferring assets to the account) based characteristics of the user associated with the account. In this manner, the disclosed systems reduce the user interactions required to create and fund accounts. Further, the disclosed systems improve network security by reducing the input and transmission of private security information.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which:

FIGS. 4A-4C illustrate a graphical user interface utilized by the account builder system to facilitate completion of an additional application requirement in accordance with one or more embodiments.

FIGS. 7A-7C illustrate a graphical user interface utilized by the account builder system to edit a funding option for funding an account in accordance with one or more embodiments.

DETAILED DESCRIPTION

Figure 1:
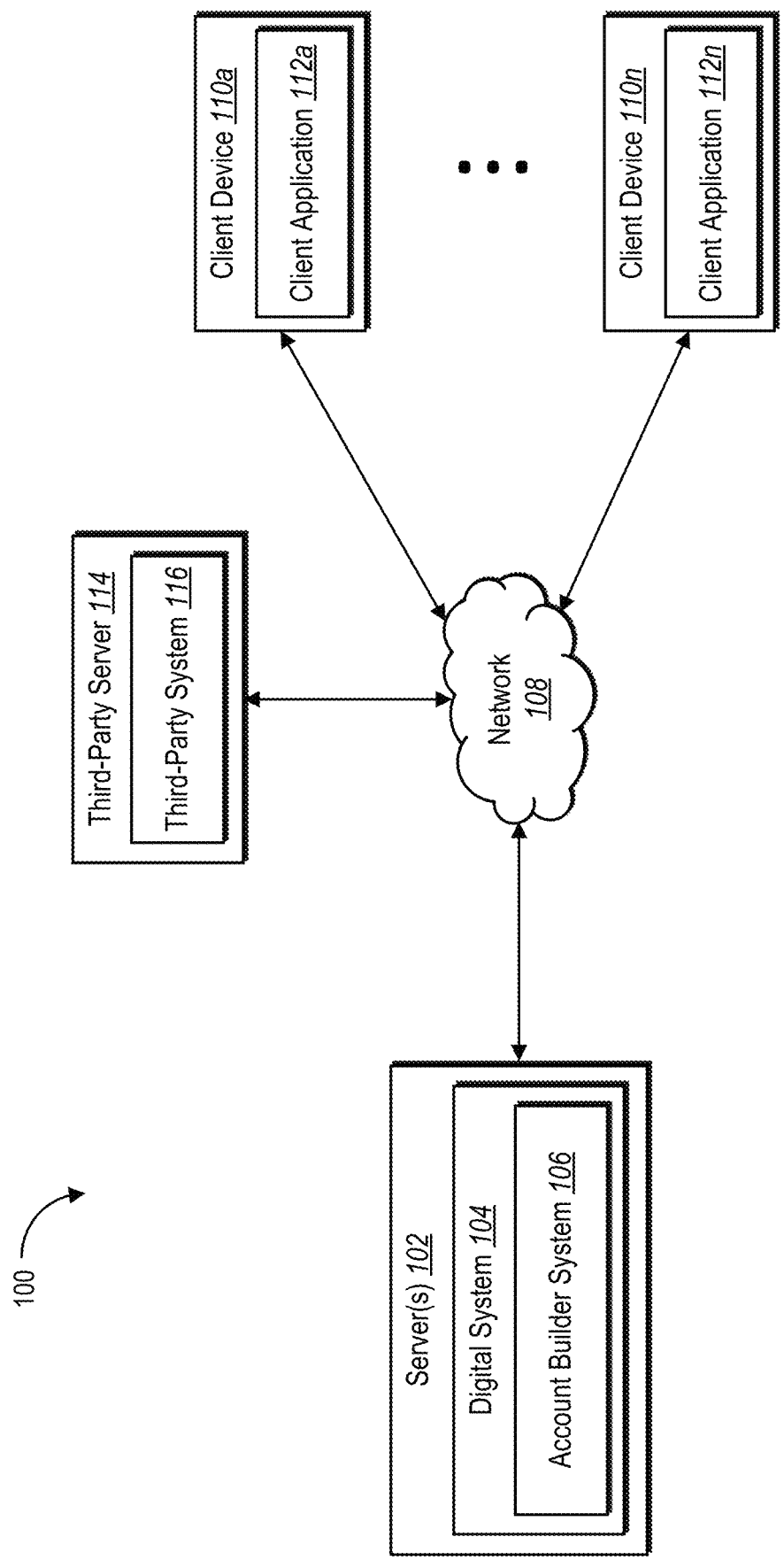
FIG. 1 an example system environment in which an account builder system can operate in accordance with one or more embodiments.

This disclosure describes one or more embodiments of an account builder system that efficiently and securely generates—and provides improved graphical user interfaces for—accounts of a digital system. For instance, in one or more embodiments, the account builder system provides a graphical user interface that facilitates the application for multiple accounts simultaneously. The account builder system can utilize the information received via the graphical user interface to create one account based on submission of the application and to create another account at a later time after one or more pre-requisite activities have been completed. In some cases, the account builder system further populates the graphical user interface with relevant options for transferring funds (e.g., assets) from one account to another. Indeed, the account builder system can determine suggested transfer amounts based on the characteristics of the corresponding user and provide options for transferring funds utilizing one of the suggested transfer amounts.

To provide an illustration, in one or more embodiments, the account builder system receives, from a client device, application information in association with enrollment of a user in a digital system. The account builder system further provides, for display within a graphical user interface of the client device, one or more selectable options for creating a first account and a second account for the digital system utilizing the application information. Based on detecting user selection of the one or more selectable options via the graphical user interface, the account builder system creates the first account for the digital system utilizing the application information. Further, based on the user selection, the account builder system monitors activity of the user with respect to the digital system, within a threshold time period, for one or more activities that satisfy one or more additional application requirements for creating the second account using the application information.

To provide another illustration, in some embodiments, the account builder system provides, for display within a graphical user interface of a client device, one or more selectable options for transferring funds associated with a first account of a user of a digital system to a second account of the user of the digital system. The account builder system executes a transfer of the funds from the first account to the second account in response to detecting user selection of the one or more selectable options via the graphical user interface. Additionally, the account builder system provides, for display within the graphical user interface of the client device, a visual animation representing the transfer of the funds from the first account to the second account.

As just mentioned, in one or more embodiments, the account builder system facilitates the simultaneous application for multiple accounts of a digital system. To illustrate, in some embodiments, the account builder system receives application information provided via a graphical user interface displayed on a client device. The account builder system further provides, for display in the graphical user interface (or another graphical user interface), options for choosing which accounts to apply for using the application information. Thus, the account builder system can receive input to apply for multiple accounts using the received account information.

In some implementations, in response to receiving input to apply for multiple accounts, the account builder system creates one or more of the accounts but delays creation of at least one of the accounts. For instance, in some cases, the account builder system establishes one or more pre-requisites that need to be satisfied before a particular account will be created (e.g., activities that need to be completed, such as activating a direct deposit feature for another account of the digital system and or depositing funds into another account via direct deposit). Thus, the account builder system can delay the creation of an account that has been applied for until the pre-requisites have been satisfied. In some cases, the account builder system establishes a threshold time period for satisfying the pre-requisites. In some instances, the account builder system provides, for display in the graphical user interface (or another graphical user interface) prompts, instructions, and/or options for satisfying the pre-requisites.

In some embodiments, in response to receiving input to apply for multiple accounts simultaneously, the account builder system utilizes the received application information to verify the identity of the user for each account. For instance, in some cases, the account builder system generates (and executes or transmits) an identity verification request for each account that has been applied for. In some implementations, the application information includes private security information (e.g., a social security number) associated with the user, and the account builder system deletes the private security information after a time period. Thus, the account builder system can verify the identity of the user for each account before the private security information is deleted.

Additionally, as mentioned above, in one or more embodiments, the account builder system provides, for display within the graphical user interface (or another graphical user interface) options for funding (e.g., transferring assets) to a created account. For instance, in some cases, the account builder system provides an option for transferring at least a portion of the current balance of another account of the digital system (e.g., a previously created account) to the created account and/or an option for transferring at least a portion of funds that will be received in the future (e.g., funds deposited into the other account via direct deposit).

In some implementations, the account builder system provides one or more suggested transfer amounts for transferring funds into the created account. For example, in some cases, the account builder system determines the one or more suggested transfer amounts based on one or more user characteristics associated with the user of the created account. To illustrate, the account builder system can implement a model to predict the behavior of the user based on the one or more user characteristics and determine the one or more suggested transfer amounts based on the predicted behavior.

Further, in some cases, the account builder system provides a visual animation representing a transfer of funds from one account of the digital system to another account of the digital system (e.g., between accounts associated with the same user). For example, the account builder system can provide a visual animation that updates the balances of the involved accounts and/or indicates that the transfer has been completed. Thus, the account builder system can utilize visual animations to reflect the series of underlying steps executed in transferring funds between accounts.

The account builder system provides several advantages over conventional network transaction systems. For instance, the account builder system operates more efficiently than conventional network transaction systems through consolidated or improved graphical user interfaces. For example, by providing a graphical user interface that facilitates the application for multiple accounts simultaneously, the account builder system reduces the number of user interactions required to apply for the accounts. As noted above, in some cases, conventional systems require client devices to tediously navigate through isolated and different series of graphical user interfaces to repeatedly input the same (or similar) information for different account types (e.g., a spending account in one digital system and a credit account in a different digital system—with different software and different graphical user interfaces). By contrast, the account builder system utilizes a consolidated graphical user interface that can intelligently capture information and (in some cases) facilitate monitoring activities for a yet-to-be-created second account. Accordingly, the account builder system utilizes the same received application information to process multiple applications—with a second account triggered by later monitored activities—thereby avoiding repetitive user interactions that would be entering similar information for separate applications under conventional systems. Indeed, in some cases, the account builder system can automatically and quickly create a second account based on monitored activities—without requiring separate and time-delayed entry by a user into separate graphical user interfaces to verify application requirements for the second account. By providing options for directly meeting account pre-requisites in a consolidated graphical user interface, the account builder system further reduces user interactions.

Further, by providing options for funding an account that has been created and animating a transfer of funds, in some embodiments, the account builder system further reduces user interactions. As noted above, in some cases, conventional systems require client devices to navigate through (and input data within) multiple input fields and across graphical user interfaces of separate software applications to link or configure funding of accounts. In contrast to the multi-application navigation through graphical user interfaces, by determining and providing suggested transfer amounts, the account building system utilizes an improved graphical user interface that reduces the number of user interactions required by existing systems to manually and meticulously control the funding process. Based on a relatively few selections of selectable options for transferring funds, for instance, the account building system facilitates transfer of funds between accounts and provides a visual animation demonstrating the selected transfer. Indeed, in some embodiments, the visual animation provides an animated snapshot of funding one account with assets from another account. The disclosed and customized funding animation is efficient, easy to understand, and (in some cases) provides a visual confirmation that avoids the cross-application navigation required to verify token amounts or other time-delayed multi-step verification.

Additionally, the account builder system provides additional security when compared to conventional network transaction systems. Indeed, by facilitating the simultaneous application for multiple accounts of a digital system, the account builder system reduces the number of times private security information is transmitted over a network. Further, by using the private security information to verify the identity of a user for each applied-for account after submission of the application—even where the creation of one of the accounts has been delayed—the account builder system can avoid saving the private security information for an extended period of time or can avoid requesting resubmission of the information when a delayed account is ready to be created. Indeed, in some embodiments, the account builder system can use private or sensitive information (e.g., social security number) to initiate applications for multiple accounts and then delete or remove such private or sensitive information (thereby avoiding hacking risks) before finishing or automatically creating a second of the multiple accounts.

As illustrated by the foregoing discussion, the present disclosure utilizes a variety of terms to describe features and benefits of the service account builder system. Additional detail is now provided regarding the meaning of these terms. For example, as used herein, the term "digital system" refers to a collection of digital services and/or features. In particular, a digital system can refer to a digital platform that provides accessibility to one or more services and/or features via a computing device, such as a client device. For instance, a digital system can include a software application that can be downloaded to or otherwise accessed by a computing device.

Additionally, as used herein, the term "account" refers to an account of a digital system that is associated with a user of the digital system. In particular, an account can refer to an account that is registered with a digital system and mapped to a particular user. The account can enable the corresponding user to interact with the digital system, such as by requesting access to services and/or features available through the digital system. In some cases, different accounts (e.g., accounts of different account types) offer access to different sets of services and/or features. Further, in some embodiments, an account includes multiple component accounts (e.g., sub-accounts). In one or more implementations, an account includes or is associated with a finance-based account. For instance, an account can include, but is not limited to, a checking account, a savings account, a credit account (e.g., an account associated with secured or unsecured credit), a secured account, an investing account, an insurance account, a lending account, or an account associated with a stored value wallet (e.g., a cryptocurrency wallet). In some cases, an account can include an account that is external to the digital system but communicates with the digital system (e.g., communicates with an account of the digital system), access services and/or features of the digital system, or provides access to services and/or features to the digital system.

Further, as used herein, the term "funds" refers to assets. In particular, funds can refer to assets that can be associated with (e.g., held by), deposited to, and/or withdrawn from an account of a digital system. As an example, funds can refer to currency (e.g., fiat currency). In some cases, funds refer to other real-world assets (e.g., titles or deeds to property or other assets) or digitally created assets (e.g., cryptocurrency) having ownership tracked and/or maintained by a digital system. Relatedly, as used herein, the term "balance" refers to funds associated with an account. In particular, a "balance" can refer to the funds held by an account.

As used herein, the term "application information" refers to information associated with application for an account of a digital system. In particular, application information can refer to information that is requested, submitted, and/or received in association with an application for an account of a digital system. In some cases, application information includes private security information. As used herein, the term "private security information" refers to personal identifiable information. In particular, private security information can refer to information that can be used to determine or portray the identity of an individual. The sensitivity of the private security information can vary. As example, private security information can include the name of an individual or the social security number of the individual.

Additionally, as used herein, the term "application requirement" refers to a requirement that must be satisfied for creation of an account of a digital system. In particular, an application requirement can refer to a pre-requisite that must be met as part of the application process for an account. For example, an application requirement can include one or more activities that are required to be performed before an account corresponding to the application is created or activated.

As used herein, the term "user characteristic" refers to a characteristic or an attribute of a person. In particular, a user characteristic can refer to an attribute of a user of an account of a digital system. To illustrate, a user characteristic includes, but is not limited to, demographic information associated with the user (e.g., gender, age, location, etc.), history of the user (e.g., past actions performed on the digital system), or a preference of the user (e.g., a preference established via an account or profile of the user). In some cases, a user characteristic includes a deposit made into at least one of the accounts (e.g., a deposit amount or time of last deposit), a salary made by the user, or an amount of at least one paycheck received by the user.

Additionally, as used herein, the term "propensity model" includes a computer-implemented model or algorithm for determining a predicted behavior of a user. In particular, a propensity model can refer to a computer-implemented model for predicting a behavior of a user with respect to funding an associated account of a digital system. For example, in some cases, a propensity model includes a scorecard applied to user characteristics of a user to determine a predicted behavior. In some cases, a propensity model includes a machine learning model that associates a user with a particular behavior (e.g., via classification).

As used herein, the term "visual animation" refers to a visual element having an animated component. In particular, a visual animation can refer to a digital graphical element that changes at least a portion of its visuals across time. Indeed, in one or more embodiments, a visual animation includes one or more "animation frames" where at least a portion of the visual element changes across multiple animation frames.

Additionally, as used herein, the term "suggested transfer amount" refers to a suggested amount of funds to deposit to an account of a digital system. In particular, a suggested transfer amount can refer to a suggested amount of funds to transfer from one account of a digital system to another account of the digital system. For example, a suggested transfer amount can refer to a suggested amount of funds to transfer between different accounts associated with the same user of a digital system.

As used herein, the term "direct deposit" refers to an institution-to-institution transfer of funds. In particular, a direct deposit can refer to a transfer of funds from an account of one institution to an account of another institution (e.g., a transfer between accounts of digital systems associated with the institutions). For instance, in some implementations, a direct deposit includes an automated clearing house (ACH) transfer. To illustrate, in some cases, a direct deposit corresponds to a payment of funds (e.g., a paycheck) from an employer to an employee via an ACH transfer.

Further, as used herein, the term "direct deposit activity" refers to activity related to a direct deposit of funds into an account of a digital system. In particular, direct deposit activity can refer to one or more actions taken on a digital system that relate to the direct deposit of funds into an account. For example, direct deposit activity can include one or more actions corresponding to activation of a direct deposit feature of a digital system for an account (e.g., submission of information that enables direct deposit). Further, direct deposit activity can include a completion of one or more direct deposits of funds into an account of a digital system.

Additional detail regarding the account builder system will now be provided with reference to the figures. For example, FIG. 1 illustrates a schematic diagram of an exemplary system environment ("environment") 100 in which an account builder system 106 can be implemented. As illustrated in FIG. 1, the environment 100 includes a server(s) 102, a network 108, user client devices 110*a*-110*n*, and a third-party server 114.

Although the environment 100 of FIG. 1 is depicted as having a particular number of components, the environment 100 can have any number of additional or alternative components (e.g., a different number of servers, user client devices, third-party servers, or other components in communication with the account builder system 106 via the network 108). Similarly, although FIG. 1 illustrates a particular arrangement of the server(s) 102, the network 108, the user client devices 110*a*-110*n*, and the third-party server 114, various additional arrangements are possible.

The server(s) 102, the network 108, the user client devices 110*a*-110*n*, and the third-party server 114 may be communicatively coupled with each other either directly or indirectly (e.g., through the network 108 as discussed in greater detail below in relation to FIG. 12). Moreover, the server(s) 102, the user client devices 110*a*-110*n*, and the third-party server 114 may include a variety of computing devices (including one or more computing devices as discussed in greater detail with relation to FIG. 12).

As mentioned, the environment 100 includes the server(s) 102. In one or more embodiments, the server(s) 102 generates, stores, receives, and/or transmits digital data, including digital data related to the creation and management of accounts of the digital system 104. For example, the server(s) 102 can receive, from a client device (e.g., one of the user client devices 110a-110n), application information to create one or more accounts for a user of the digital system 104 and provide notifications regarding the status of the application in return. In one or more embodiments, the server(s) 102 comprises a data server. In some embodiments, the server(s) 102 comprises a communication server or a web-hosting server.

As shown, the server(s) 102 includes the digital system 104. In one or more embodiments, the digital system 104 provides a collection of digital services and/or features. Further, the digital system 104 can manage associated accounts. For example, the digital system 104 can create accounts, verify the identities of users applying for accounts, close or suspend accounts, and/or provide at least some of the digital services to each of the accounts. To provide an illustration, in one or more embodiments, the digital system 104 includes a digital finance system that provides digital financial services (e.g., banking services, investment services, services related to cryptocurrency, etc.). Accordingly, in some embodiments, an account of the digital system 104 can include a deposit account (e.g., a checking or savings account), a credit account that operates on credit transactions, or a secured account that is linked to a credit account and secures a credit limit associated with the credit account.

Additionally, the server(s) 102 include the account builder system 106. In particular, in one or more embodiments, the account builder system 106 utilizes the server(s) 102 to build accounts for the digital system 104. For example, in some embodiments, the account builder system 106 receives, via the server(s) 102, application information in association with a user applying for multiple accounts of the digital system 104 simultaneously. Via the server(s) 102, the account builder system 106 can create one of the accounts using the application information while delaying creation of at least one of the other accounts until one or more additional application requirements have been satisfied. In some cases, the account builder system 106 further, via the server(s) 102, provides options for depositing funds to, withdrawing funds from, or transferred funds between different accounts of a user.

In one or more embodiments, the third-party server 114 interacts with the account builder system 106, via the server(s) 102, over the network 108. For example, the third-party server 114 can host a third-party system 116, such as an identity verification system, that verifies a user identity during registration of an account. For instance, the third-party system 116 can verify private security information submitted to the digital system 104 as part of the application process. Accordingly, the third-party server 114 can transmit a scorecard corresponding to the private security information to the account builder system 106 over the network 108. In some cases, the third-party system 116 includes a financial system. To illustrate, in some cases, the digital system 104 provides an interface, account management, and associated features while the third-party system 116 provides the underlying financial services.

In one or more embodiments, the client devices 110a-110n include computing devices that are capable of accessing the digital system 104 (e.g., to apply for accounts or utilize the services and/or feature offered). For example, in some implementations, the client devices 110a-110n include at least one of a smartphone, a tablet, a desktop computer, a laptop computer, a head-mounted-display device, or other electronic device. In some instances, the client devices 110a-110n include one or more applications (e.g., the client applications 112a-112n, respectively) that are capable of accessing the digital system 104 (e.g., to apply for accounts or utilize the services and/or feature offered). For example, in some embodiments, the client applications 112a-112n include a software application installed on the client devices 110a-110n, respectively. In other cases, however, the client applications 112a-112n include a software application hosted on the server(s) 102 (and supported by the digital system 104), which is accessible by the client devices 110a-110n, respectively, through another application, such as a web browser.

The account builder system 106 can be implemented in whole, or in part, by the individual elements of the environment 100. Indeed, although FIG. 1 illustrates the account builder system 106 implemented with regard to the server(s) 102, different components of the account builder system 106 can be implemented by a variety of devices within the environment 100. For example, one or more (or all) components of the account builder system 106 can be implemented by a different computing device (e.g., one of the user client devices 110a-110n) or a separate server from the server(s) 102 hosting the digital system 104.

Figure 2A:
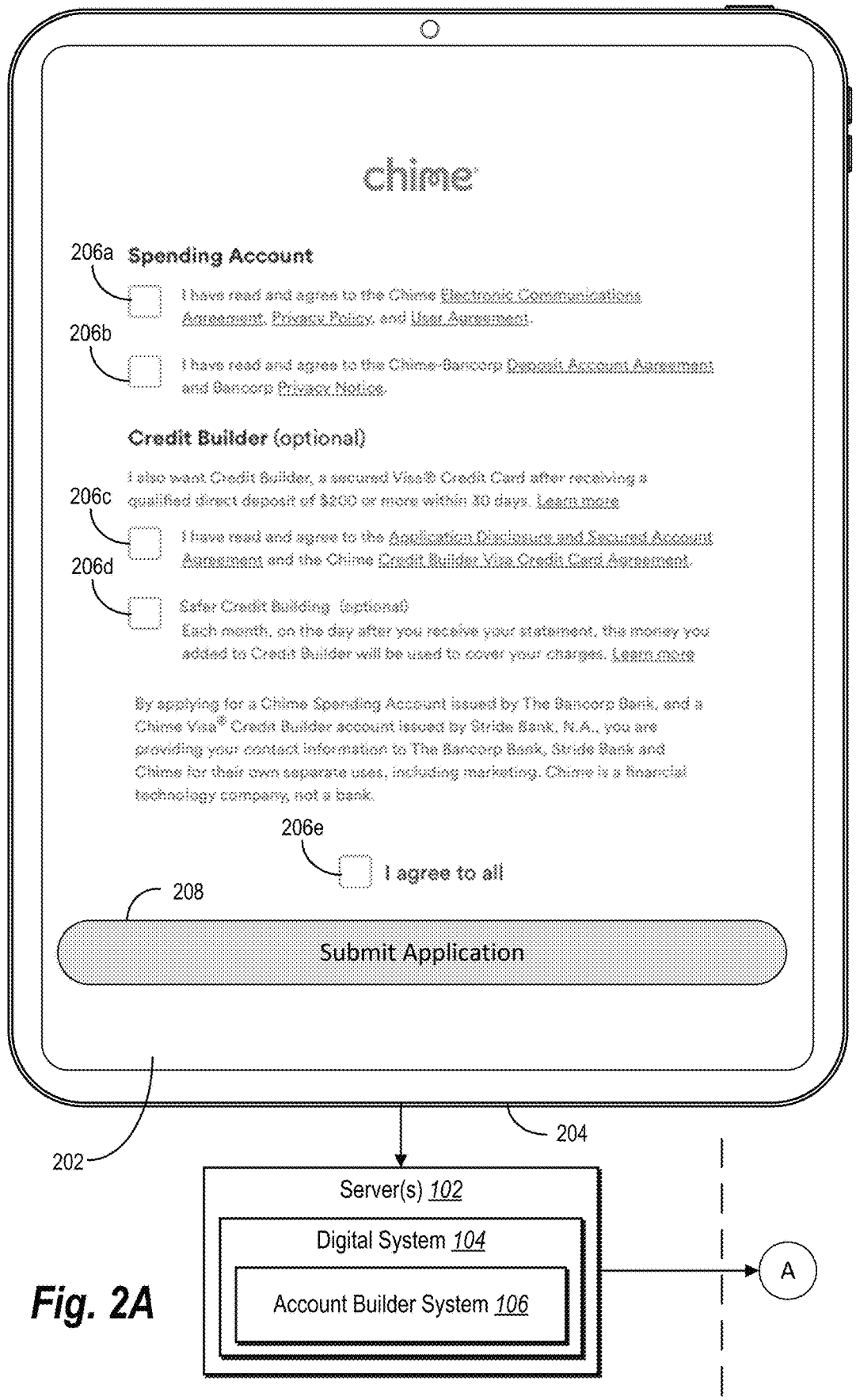
FIGS. 2A-2B illustrates an overview diagram of the account builder system utilizing graphical user interfaces to build accounts of a digital system in accordance with one or more embodiments.
Figure 2B:
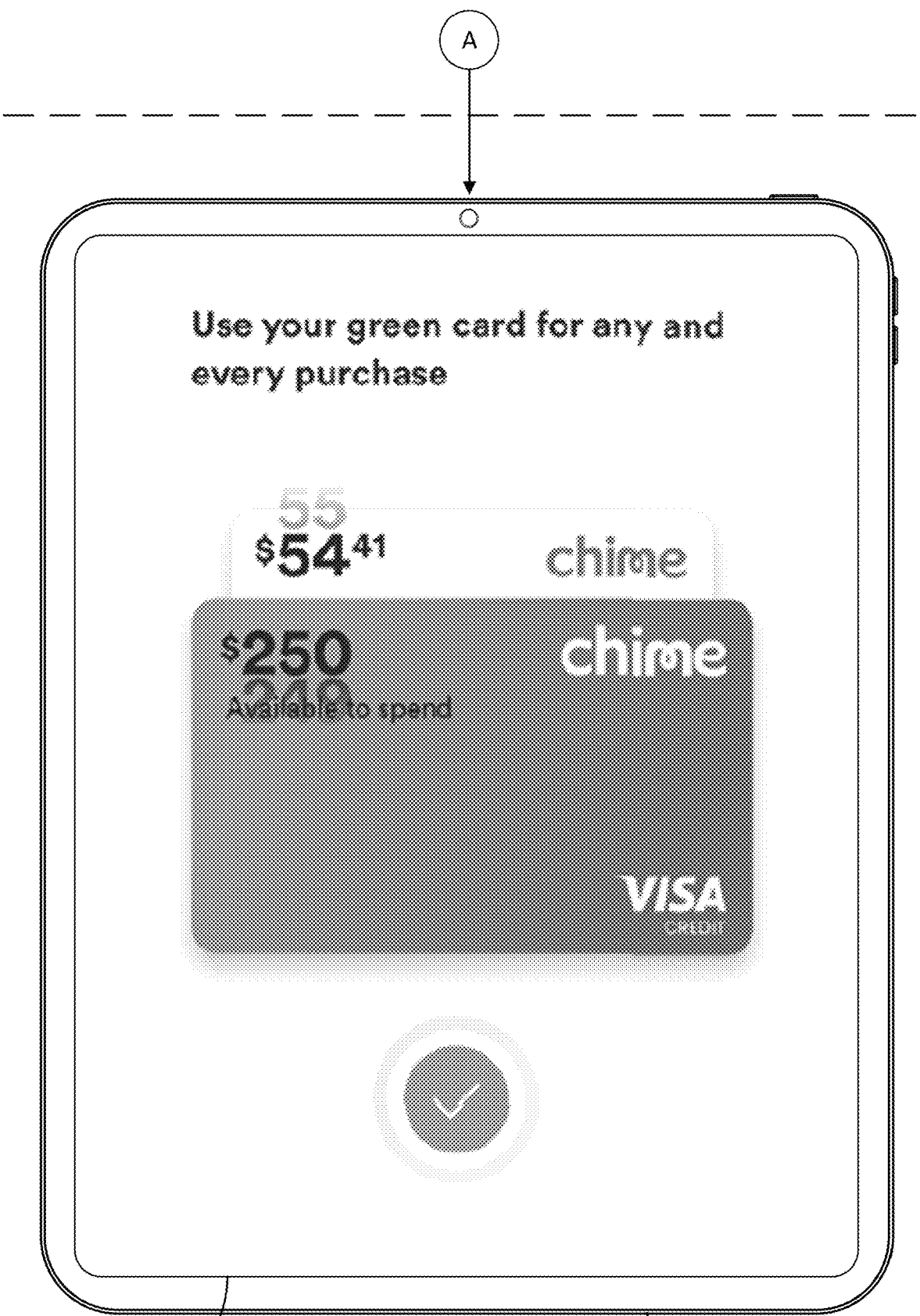

As discussed above, in one or more embodiments, the account builder system 106 facilitates the building of accounts of a digital system. In particular, the account builder system 106 utilizes graphical user interfaces to facilitate the building of accounts. FIGS. 2A-2B illustrates an overview diagram of the account builder system 106 utilizing graphical user interfaces to build accounts of a digital system in accordance with one or more embodiments.

For example, as shown in FIGS. 2A-2B, the account builder system 106 provides a graphical user interface 202 for display on a client device 204 to facilitate creation of one or more accounts of a digital system. In particular, as shown, the account builder system 106 provides, for display within the graphical user interface 202, selectable options 206a-206e for applying for multiple accounts. For example, the account builder system 106 can provide the selectable options 206a-206b for selecting to apply for a first account of the digital system and the selectable options 206c-206d for selecting to apply for the second account of the digital system. Further, the account builder system 106 can provide the selectable option 206e for simultaneously selecting to apply for the first and second accounts (e.g., as an alternative to manually selecting the selectable options 206a-206d). FIGS. 2A-2B illustrates selectable options for selecting to apply for a particular number of accounts; however, the account builder system 106 can provide selectable options for selecting to apply for various numbers of accounts in various embodiments.

As shown in FIGS. 2A-2B, in one or more embodiments, the account builder system 106 provides the selectable options 206a-206e in association with terms and services for a user to review and accept in applying for the first and second accounts. In some cases, however, the account builder system 106 provides the selectable options separately (e.g., in a separate graphical user interface) before or after the user has reviewed and agreed to the terms and services.

In some implementations, the account builder system 106 provides the selectable options 206a-206e after receiving application information in conjunction with the application for the first account and/or the second account. For example, in some cases, the account builder system 106 provides the selectable options 206a-206e at the end of an enrollment workflow for applying to the first account and/or the second account. Indeed, as shown in FIGS. 2A-2B, the account builder system 106 further provides a selectable option 208 for submitting the application (e.g., completing the process of requesting creation of the first account and/or the second account). Thus, in some cases, the account builder system 106 determines that selection of one or more of the selectable options 206a-206e indicate that the corresponding accounts are to be created using the received application information.

It should be noted, however, that the account builder system 106 can provide the selectable options 206a-206e at various points during the enrollment workflow in various embodiments. Further, in some cases, the client device 204 delays transmission of the application information until selection of the selectable option 208 for submitting the application. Thus, in some cases, the account builder system 106 receives the application information and detects selection of one or more of the selectable options 206a-206e based on selection of the selectable option 208 for submitting the application.

In one or more embodiments, the account builder system 106 utilizes the application information to create the first account and/or the second account. For example, the account builder system 106 can create the first account and/or the second account based on selection of the selectable option 208 (or in response to the selection of the selectable option 208 and verification of the user's identity). In some implementations, as will be discussed in more detail below, at least one of the accounts is associated with one or more additional application requirements. Accordingly, in some cases, the account builder system 106 delays creation of the account(s) having the additional application requirements and monitors activity of the user with respect to the digital system for one or more activities that satisfy the additional application requirements.

As further shown in FIGS. 2A-2B, the account builder system 106 also utilizes a graphical user interface 210 of the client device 204 to facilitate funding of an account of the digital system. In particular, the account builder system 106 can provide, for display within the graphical user interface 210, various selectable options and/or other features for providing funds to the account. For example, as will be discussed in more detail below, the account builder system 106 can provide selectable options and/or other features for transferring funds from one account associated with a user of the digital system to another account associated with the user. As further illustrated by FIGS. 2A-2B, the account builder system 106 can provide a visual animation representing the provision of funds to the account.

In one or more embodiments, the account builder system 106 creates an account that has been applied for by creating multiple component accounts (e.g., multiple sub-accounts) and then funds the account by funding at least one of its component accounts. To illustrate, in some cases, the account builder system 106 creates an account for a user by creating a credit account and a secured account that is linked to the credit account and secures a credit limit associated with the credit account. Further, the account builder system 106 funds the account by transferring funds into the secured account (e.g., from another account associated with the same user)—the funds then being accessible by the credit account for credit transactions. Thus, in some cases, based on detecting a selection of one or more selectable options to create a particular account, the account builder system 106 creates two component accounts—as a credit account and a secured account that is linked to the credit account. Indeed, in some embodiments, the account builder system 106 creates and funds a credit account or a secured account as described in U.S. patent application Ser. No. 17/538,753 filed on Nov. 30, 2021, entitled FACILITATING FEE-FREE CREDIT-BASED WITHDRAWALS OVER COMPUTER NETWORKS UTILIZING SECURED ACCOUNTS, which is incorporated herein by reference in their entirety.

Figure 3A:
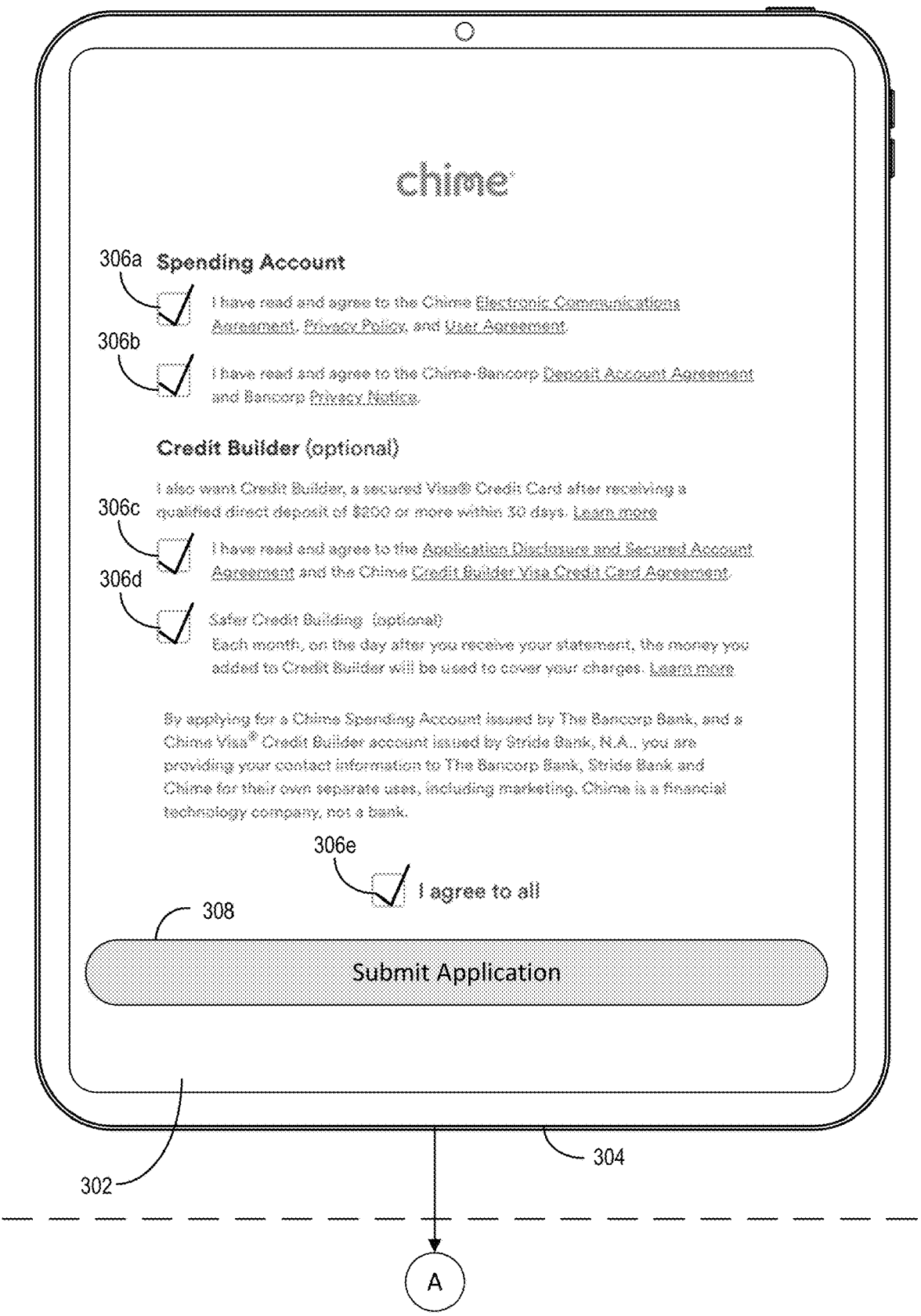
FIGS. 3A-3B illustrates a block diagram for facilitating simultaneous application and/or creation of multiple accounts via a graphical user interface in accordance with one or more embodiments.
Figure 3B:
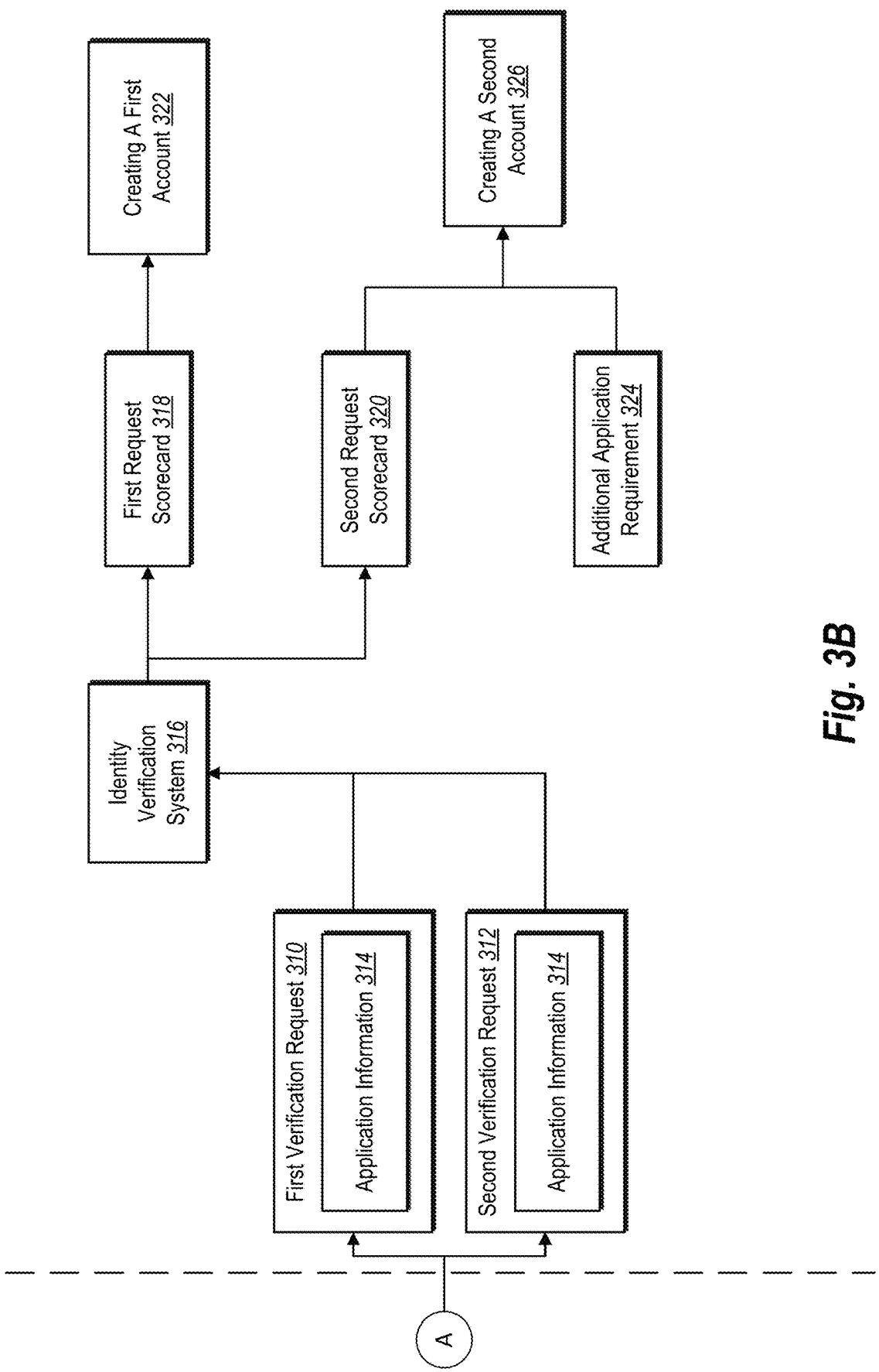

As previously discussed, the account builder system 106 utilizes a graphical user interface to facilitate the creation of one or more accounts of a digital system. In particular, the account builder system 106 utilizes the graphical user interface to facilitate simultaneous application of one or more accounts of the digital system. FIGS. 3A-3B illustrates a block diagram for facilitating simultaneous application and/or creation of multiple accounts via a graphical user interface in accordance with one or more embodiments.

Indeed, as shown in FIGS. 3A-3B, the account builder system 106 provides, for display within a graphical user interface 302 of a client device 304, selectable options 306a-306e for applying for multiple accounts of a digital system. Further, the account builder system 106 detects selection of one or more of the selectable options 306a-306e indicating that the user of the client device 304 is selecting to apply for the multiple accounts. The account builder system 106 can provide the selectable options 306a-306e for display at various points of the enrollment workflow during which application information is provided.

As further shown in FIGS. 3A-3B, based on detecting selection of one or more of the selectable options 306a-306e indicating that the user is selecting to apply for multiple accounts (e.g., after selection of the selectable option 308), the account builder system 106 generates multiple requests to verify the identity of the user. In particular, in one or more embodiments, the account builder system 106 generates a request for each account for which the user is applying. For instance, as shown in FIGS. 3A-3B, the account builder system 106 generates a first verification request 310 that corresponds to a first account and a second verification request 312 that corresponds to a second account.

As illustrated in FIGS. 3A-3B, the first verification request 310 and the second verification request 312 include application information 314. Indeed, in one or more embodiment, both verification requests include (or are generated using) the application information 314 that is collected via the enrollment workflow. In some cases, the application information 314 includes private security information associated with the user applying for the accounts.

As further shown in FIGS. 3A-3B, the account builder system 106 provides the first verification request 310 and the second verification request 312 to an identity verification system 316. In one or more embodiments, the identity verification system 316 includes a third-party system that processes verification requests. In some cases, the identity verification system 316 includes a component of the account builder system 106 (e.g., the account builder system 106 directly performs the verification process itself). Either way, the account builder system 106 can verify (e.g., via know your customer verification) of the identity of the user applying for the first account and the second account.

As illustrated, the account builder system 106 receives (or generates) scorecards in response to the verification requests. In particular, the account builder system 106 receives (or generates) a first request scorecard 318 corresponding to the first verification request 310 and a second request scorecard 320 corresponding to the second verification request 312. In one or more embodiments, the first request scorecard 318 and the second request scorecard 320 each include a score determined using the application information 314 sent as part of first verification request 310 and the second verification request 312, respectively. The scores can indicate, for example, a confidence in the validity of the user's identity determined via the verification process.

In one or more embodiments, because the accounts for which the user is applying differ (e.g., the services and/or features associated with the accounts differ), the verification process also differs. Accordingly, in some implementations, the scores included in the first request scorecard 318 and the second request scorecard 320 also differ. Further, the account builder system 106 can utilize the scores of the first request scorecard 318 and the second request scorecard 320 in determining to create the first account and the second account, respectively.

Indeed, as shown in FIGS. 3A-3B, in response to receiving the first request scorecard 318, the account builder system 106 performs an act 322 of creating the first account. In particular, the account builder system 106 can determine whether a score provided by the first request scorecard 318 satisfies a verification score threshold associated with the first account (e.g., associated with an account type of the first account). Based on determining that the score satisfies the verification score threshold, the account builder system 106 can create the first account. It should be noted that, in some cases, the account builder system 106 creates the first account without the verification process. In other words, the account builder system 106 creates the first account directly in response to selection of one or more of the selectable options 306a-306e indicating that the user is applying for the first account.

As further illustrated in FIGS. 3A-3B, the account builder system 106 performs an act 326 of creating the second account in response to receiving the second request scorecard 320 and based on satisfaction of an additional application requirement 324. Indeed, in one or more embodiments, the second account is associated with an additional application requirement (or multiple additional application requirements) that must be satisfied before creation of the account. Accordingly, the account builder system 106 can monitor the activity of the user with respect to the digital system for one or more activities that satisfy the additional application requirement 324.

In some implementations, the account builder system 106 establishes a threshold time period within which the additional application requirement 324 must be satisfied after the application for the second account is submitted. For instance, if the additional application requirement 324 is not satisfied within the threshold time period, the account builder system 106 can cancel the creation of the second account. In some implementations, as will be discussed below, the account builder system 106 provides notifications or selectable options for facilitating completion the additional application requirement 324 in the graphical user interface 302 or another graphical user interface. In some cases, the account builder system 106 can determine whether the additional application requirement 324 was satisfied before the application for the second account was submitted.

To illustrate, in one or more embodiments, the additional application requirement 324 includes a requirement that a particular amount of funds be directly deposited into another account of the digital system that is associated with the user. For example, the additional application requirement 324 can require that the cumulative total of funds from one or more direct deposits into the other account meets or exceeds a direct deposit threshold. Accordingly, the account builder system 106 can monitor direct deposit activity to determine whether a direct deposit feature has been activated for the other account and/or whether an amount of funds directly deposited into the other account satisfies a direct deposit threshold.

Thus, the account builder system 106 can condition creation of the second account based on satisfaction of the additional application requirement 324 and verification of the user's identity in response to the second verification request 312. In particular, the account builder system 106 can determine whether a score provided by the second request scorecard 320 satisfies a verification score threshold associated with the second account (e.g., associated with an account type of the second account). Based on determining that the score satisfies the verification score threshold, the account builder system 106 can create the second account. It should be noted that, in some cases, the account builder system 106 creates the second account without the verification process and/or without satisfaction of the additional application requirement 324. In other words, the account builder system 106 creates the second account directly in response to selection of one or more of the selectable options 306a-306e indicating that the user is applying for the second account.

Thus, the account builder system 106 can facilitate the simultaneous application for multiple accounts of a digital system. Further, in one or more embodiments, the account builder system 106 creates one of the accounts based on submission of the application but delays the creation of one of the other accounts to wait on satisfaction of one or more additional application requirements. As such, the account builder system 106 enables a user to submit application information once for multiple applications, even if the creation of one of those accounts depends on performance of one or more additional activities.

Indeed, by utilizing a graphical user interface to facilitate the simultaneous application for multiple accounts, the account builder system 106 operates more efficiently than conventional network transaction systems. Indeed, the account builder system 106 reduces the amount of user inputs required in applying for multiple accounts. Further, the account builder system 106 operates more securely as it reduces the number of times private security information is submitted in applying for accounts. Indeed, as the account builder system 106 verifies the identity of the user for all accounts that have been applied for up front—even where satisfaction of an additional application requirement is pending for one of the accounts—the account builder system 106 can utilize the private security information as needed to avoid requesting the information again at a later time or holding onto the information for an extended period of time. This is especially noteworthy in contexts where the account builder system 106 operates in environments where regulations or industry standards require deletion of private security information after a certain time period.

Figure 4C:
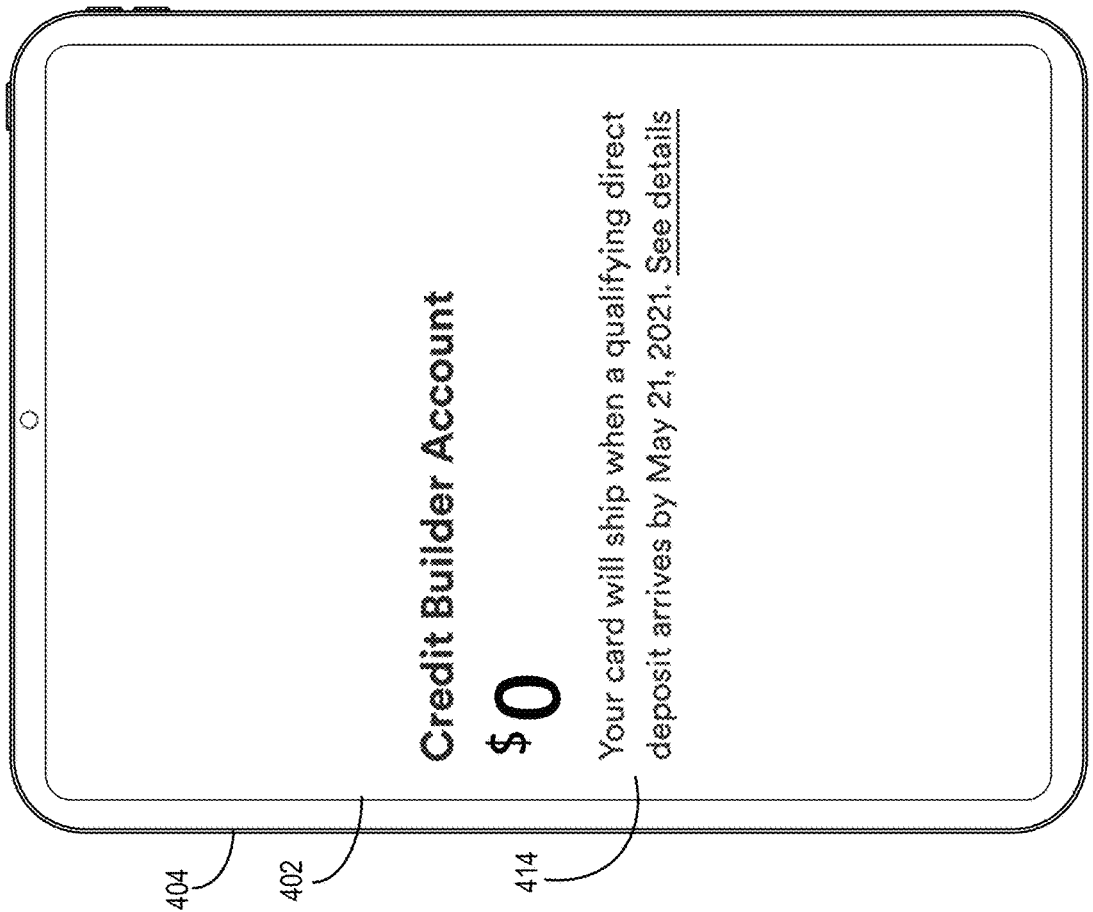

As mentioned above, in one or more embodiments, the account builder system 106 provides selectable options to facilitate completion of one or more additional application requirements that must be met before an account is created. In particular, the account builder system 106 provides the selectable options for display within a graphical user interface. FIGS. 4A-4C illustrate a graphical user interface utilized by the account builder system 106 to facilitate completion of an additional application requirement in accordance with one or more embodiments.

In particular, as shown in FIG. 4A, the account builder system 106 provides a graphical user interface 402 for display on a client device 404. In one or more embodiments, the account builder system 106 provides the graphical user interface 402 based on determining that the user has submitted an application for at least one account associated with one or more additional application requirements (e.g., via the process described above). In some cases, the account builder system 106 provides the graphical user interface 402 based on determining that the client device 404 has opened a client application or accessed a website corresponding to the digital system (e.g., as part of a home screen of the client application or website).

As further shown in FIG. 4A, the account builder system 106 provides a notification 406 regarding the account having the additional application requirement and a selectable option 408 for applying for the account. In some cases, the account builder system 106 provides the notification 406 and the selectable option 408 regardless of whether the user has already applied for the account (e.g., via the process described above).

In one or more embodiments, if the user has already applied for the account, the account builder system 106 provides selectable options within the graphical user interface 402 for completing the additional application requirement based on selection of the selectable option 408. For instance, where the additional application requirement requires activation of a direct deposit feature, the account builder system 106 can provide selectable options for activating the direct deposit feature (e.g., selectable options for entering employer information or selecting an existing account of the user to receive the direct deposit). In some embodiments, if the user has already applied for the account, the account builder system 106 directly provides options for completing the additional application requirement within the graphical user interface 402 rather than providing the notification 406 and the selectable option 408 first. In some cases, the account builder system 106 provides additional details regarding the account and/or the additional application requirement in response to selection of the selectable option 408 and further provides a selectable option to progress from the additional details to completion of the additional application requirement.

In one or more embodiments, if the user has not already applied for the account, the account builder system 106 provides selectable options within the graphical user interface 402 for applying for the account based on selection of the selectable option 408. For example, the account builder system 106 can provide the selectable options described above in relation to the application process. Based on completion of the application process, the account builder system 106 can provide selectable options for completing the additional application requirement.

As shown in FIG. 4B, the account builder system 106 provides a notification 410 regarding completion of the process for the additional application requirement and a selectable option 412 for completing the process within the graphical user interface 402. For instance, in one or more embodiments, the account builder system 106 provides the notification 410 and the selectable option 412 based on determining that the user initiated and then exited the process for completing the additional application requirement before finishing the process. For instance, the account builder system 106 can determine that the user closed the client application or website before finishing the process and provides the notification 410 and the selectable option 412 when the client application or website is re-opened. Thus, based on selection of the selectable option 412, the account builder system 106 can provide selectable options for finishing the process. For example, the account builder system 106 can provide selectable options for inputting information and/or making selections that are still needed to complete the additional application requirement.

As shown in FIG. 4C, the account builder system 106 provides a notification 414 based on completion of the additional application requirement. As shown, the notification 414 can include information regarding another application requirement that follows completion of the additional application requirement. In particular, the account builder system 106 provides the notification 414 after activation of a direct deposit feature. The notification 414 indicates that, for the account to be created, an amount of funds needs to be deposited into another account via direct deposit (e.g., the account selected during activation of the direct deposit feature).

Thus, the account builder system 106 can provide a flow of notifications and selectable options within a graphical user interface to facilitate completion of additional application requirements that must be satisfied before creation of an account. Indeed, as described, the account builder system 106 can provide a flow that facilitates engagement with the process of completing an additional application requirement as described with FIG. 4A, continuance with the process if the process was prematurely exited as described with FIG. 4B, and fulfillment of the process as described with FIG. 4C.

In one or more embodiments, by providing the flow of notifications and selectable options described above, the account builder system 106 can operate more efficiently than conventional network transaction systems. Indeed, the account builder system 106 can identify additional application requirements that must be completed for the creation of an account for which a user has applied and then provide options for satisfying those requirements. Thus, the account builder system 106 reduces the steps requirement for a user to navigate an interface of an application or website to locate the options needed for completing the requirement. When providing the flow based on submission of an application for an account associated with additional application requirements, the account builder system 106 further reduces the steps needed by directly facilitating completion of the additional requirements as part of the enrollment flow.

In one or more embodiments, the account builder system 106 further provides additional notifications to a client device regarding additional application requirements for an account (e.g., via email, text, pop-up notification, etc.). Indeed, in some embodiments, the account builder system 106 determines that a user has applied for an account but has not completed one or more additional application requirements associated with the account. Thus, the account builder system 106 can provide one or more notifications to a client device associated with the user to facilitate completion of the additional application requirement(s). For example, in some instances, the account builder system 106 provides a series of notifications at regular intervals within the threshold time period for completing the additional application requirements. Based on cancelling creation of an account for failure to complete an additional application requirement within the threshold time period, the account builder system 106 can provide one or more notifications that facilitate re-application for that account.

As previously discussed, the account builder system 106 can further facilitate funding of an account that has been created for a user of a digital system. FIGS. 5A-8D illustrate graphical user interfaces utilized by the account builder system 106 to facilitate funding of an account in accordance with one or more embodiments. In particular, FIGS. 5A-8D illustrate a flow of graphical user interfaces (or selectable options within a single graphical user interface) that facilitate funding of an account.

Figure 5B:
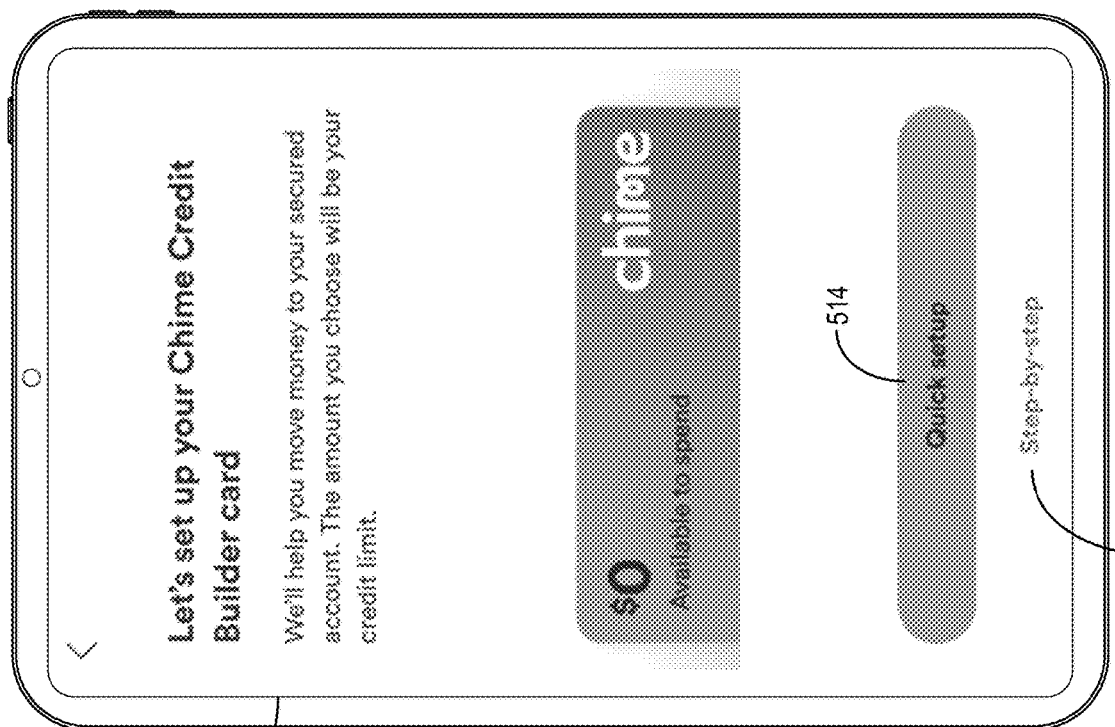
FIGS. 5A-5B illustrate alternative graphical user interfaces utilized to facilitate initiating the process for funding an account.
Figure 5A:
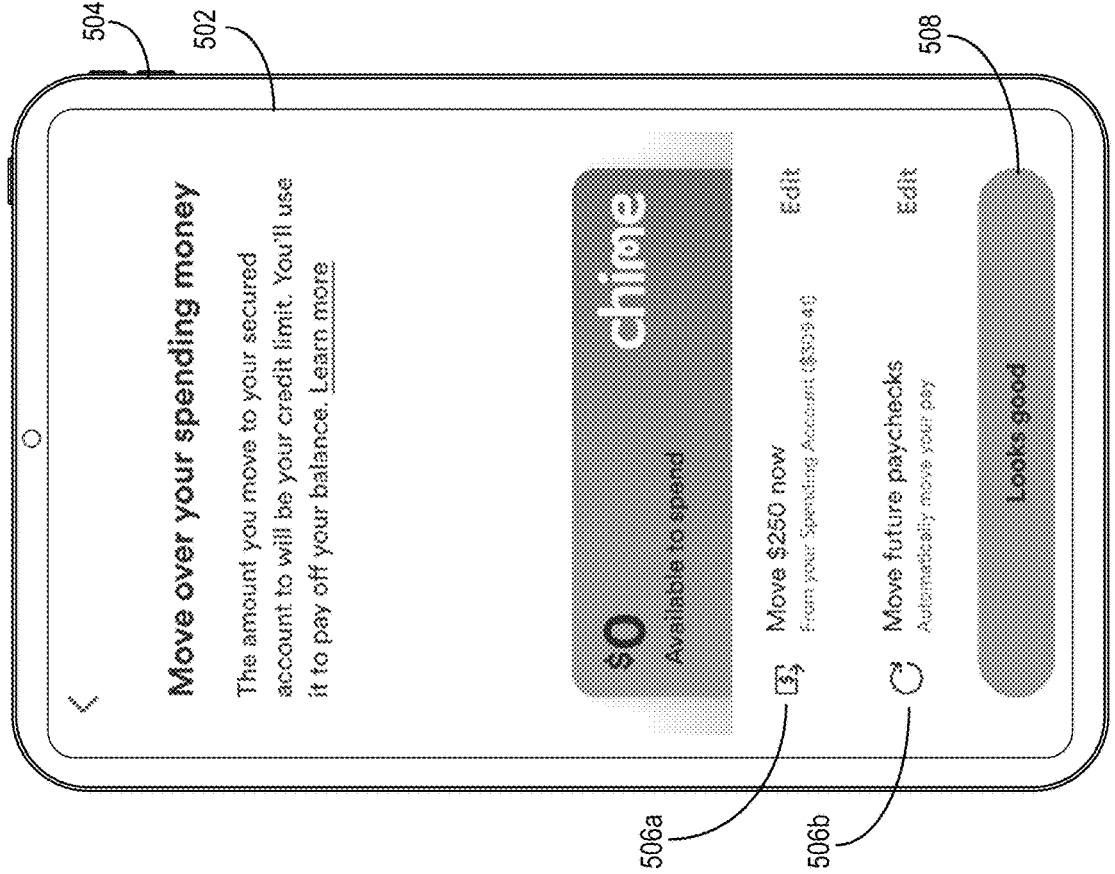

FIGS. 5A-5B illustrate graphical user interfaces utilized by the account builder system 106 to initiate a process for funding an account in accordance with one or more embodiments. In particular, FIGS. 5A-5B illustrate alternative graphical user interfaces utilized to facilitate initiating the process for funding an account.

As shown in FIG. 5A, the account builder system 106 provides a graphical user interface 502 for display on a client device 504. In particular, the graphical user interface 502 provides a quick-setup option for funding an account. Indeed, as shown in FIG. 5A, the account builder system 106 provides, for display within the graphical user interface 502, funding options 506a-506b for funding the account. As further shown in FIG. 5A, the account builder system 106 provides a selectable option 508 for accepting one or more of the funding options 506a-506b. In particular, in some cases, the account builder system 106 associates a transfer amount with each of the funding options 506a-506b (e.g., either a suggested transfer amount or a transfer amount selected by the user). Thus, selection of the selectable option 508 indicates an acceptance of the transfer amount currently associated with each of the funding options 506a-506b. More detail regarding the functionality of the account builder system 106 with respect to the funding options 506a-506b and the selectable option 508 will be provided below.

As shown in FIG. 5B, the account builder system 106 provides a graphical user interface 510 for display on a client device 512. The account builder system 106 provides, for display within the graphical user interface 510, a selectable option 514 for funding an account via a quick-setup funding process and a selectable option 516 for funding an account via a step-by-step funding process. In one or more embodiments, based on selection of the selectable option 514, the account builder system 106 provides the graphical user interface 502 for the quick-setup option discussed in relation to FIG. 5A.

In some cases, based on selection of the selectable option 516, the account builder system 106 provides a sequence of selectable options for funding the account. Indeed, FIGS. 6A-8D illustrate various selectable options and graphical user interfaces presented in response to a user interacting with the graphical user interface 502 for the quick-setup option. It should be understood that, in some cases, based on selection of the selectable option 516, the account builder system 106 presents similar selectable options but within a sequence that the user navigates step-by-step in order to ensure that multiple potential options for funding the account have been addresses.

FIGS. 6A-6D illustrates a sequence of one or more visual animations provided within a graphical user interface in response to selection of a selectable option to accept one or more funding options for an account in accordance with one or more embodiments. As indicated, the account builder system 106 can determine and provide a suggested transfer amount for at least one of the funding options that is presented. Thus, in some cases, the account builder system 106 facilitates efficient funding of the account with very few user interactions (e.g., selection of the selectable option to accept the funding option(s)) when compared to the significant navigation of user interfaces required under conventional network transaction systems.

Similar to the graphical user interface 502 discussed above with reference to FIG. 5A, FIG. 6A illustrates the account builder system 106 providing a graphical user interface 602 for display on a client device 604. As further shown in FIG. 6A, the account builder system 106 provides, for display within the graphical user interface 602, funding options 606a-606b for funding the account. In particular, the account builder system 106 provides the funding option 606a for transferring funds to the account from another account (e.g., another account associated with the same user). The account builder system 106 further provides the funding option 606b for transferring, into the account, a portion of one or more future paychecks that are deposited into another account via a direct deposit feature.

As further shown, the account builder system 106 provides a suggested transfer amount 624 for display in association with the funding option 606a. In one or more embodiments, the account builder system 106 determines the suggested transfer amount 624 based on a current balance of the other account from which the funds are to be transferred. For example, the account builder system 106 can determine the suggested transfer amount 624 by applying a percentage value (e.g., 50%) to the current balance to the other account. In some cases, if the resulting amount includes a fractional unit (e.g., a fraction of a dollar), the account builder system 106 rounds the amount to the nearest whole unit (e.g., whole-dollar value) to determine the suggested transfer amount 624. In some cases, in providing the suggested transfer amount 624, the account builder system 106 further suggests the other account from which to transfer the funds (e.g., the account of the user with the largest current balance).

Figure 6B:
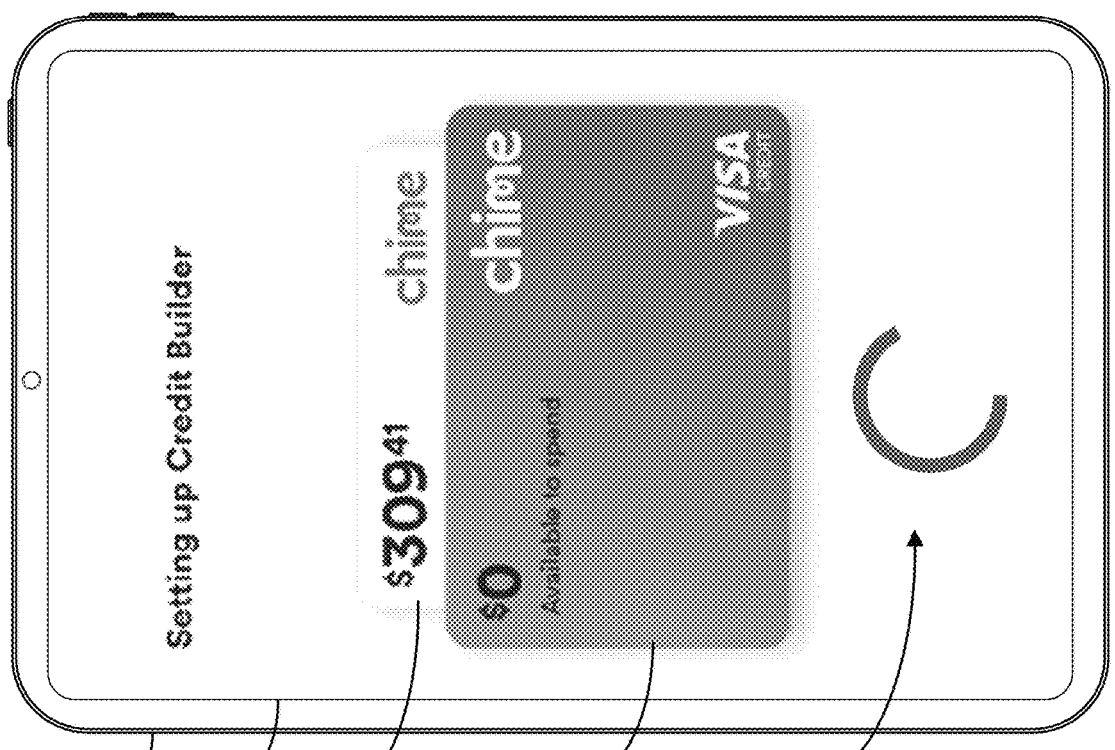
FIGS. 6A-6D illustrates a sequence of one or more visual animations provided within a graphical user interface in response to selection of a selectable option to accept one or more funding options for an account in accordance with one or more embodiments.
Figure 6A:
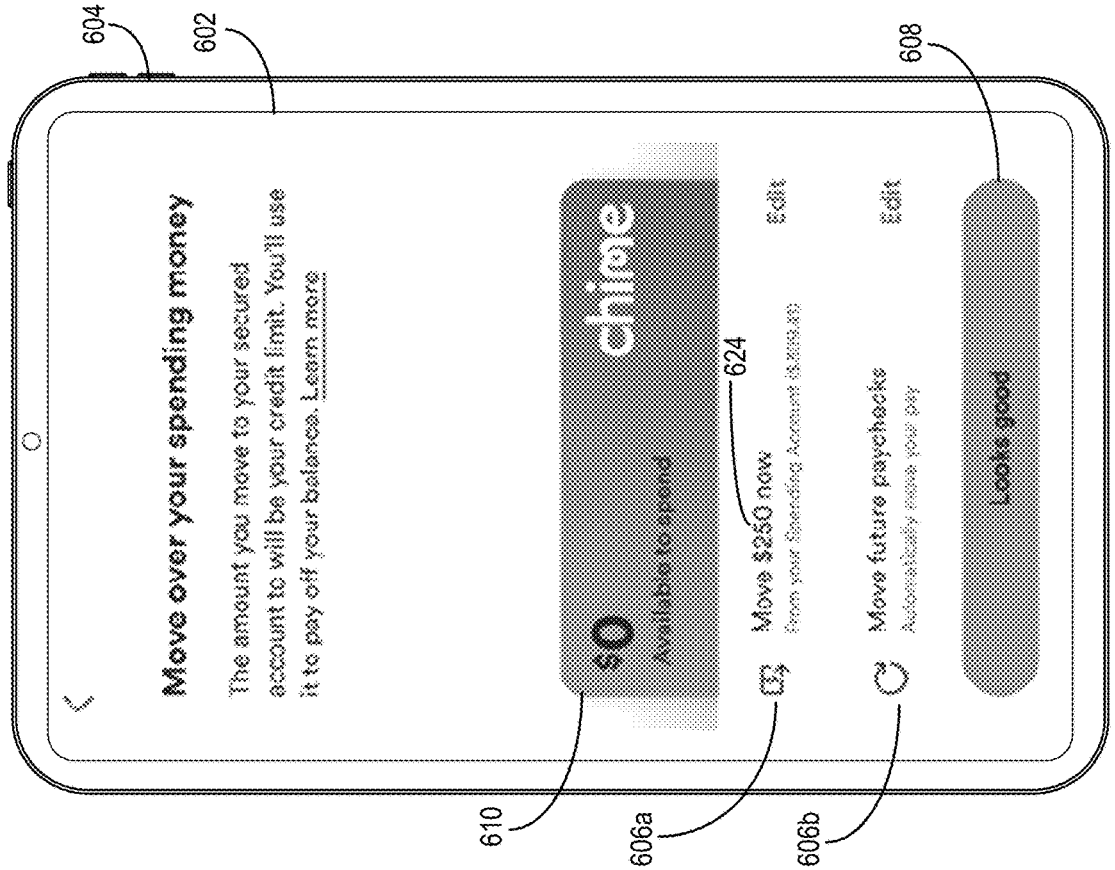

Though a suggested transfer amount is not shown for the funding option 606b in FIG. 6A, the account builder system 106 can determine and provide a suggested transfer amount for the funding option 606b in some embodiments. For instance, in some cases, the account builder system 106 determines a suggested transfer amount based on one or more user characteristics associated with the user of the account to which funds are directly deposited as will be discussed further below with reference to FIGS. 9A-9B.

As shown, the account builder system 106 also provides, for display within the graphical user interface 602, a selectable option 608 for accepting one or more of the funding options 606a-606b. In particular, based on selection of the selectable option 608, the account builder system 106 can determine that the user has accepted the transfer amounts associated with one or more of the funding options 606a-606b (e.g., the suggested transfer amounts or transfer amounts selected by the user). For reference, FIG. 6A further illustrates that the account builder system 106 can provide, for display within the graphical user interface 602, a visual element 610 representing the account to be funded.

Indeed, based on selection of the selectable option 608, the account builder system 106 can initiate the process for funding the account. The account builder system 106 can further provide, for display within the graphical user interface 602, one or more visual indications of the funding process. For example, FIG. 6B illustrates the account builder system 106 providing a visual animation to indicate that a transfer of funds to the account from another account has been initiated. In particular, the account builder system 106 provides, within the graphical user interface 602, the visual element 610 representing the account to be funded and a visual element 612 representing the other account from which the funds are to be transferred. The account builder system 106 further provides, for display, a visual indicator 614 that the transfer is processing.

Figure 6D:
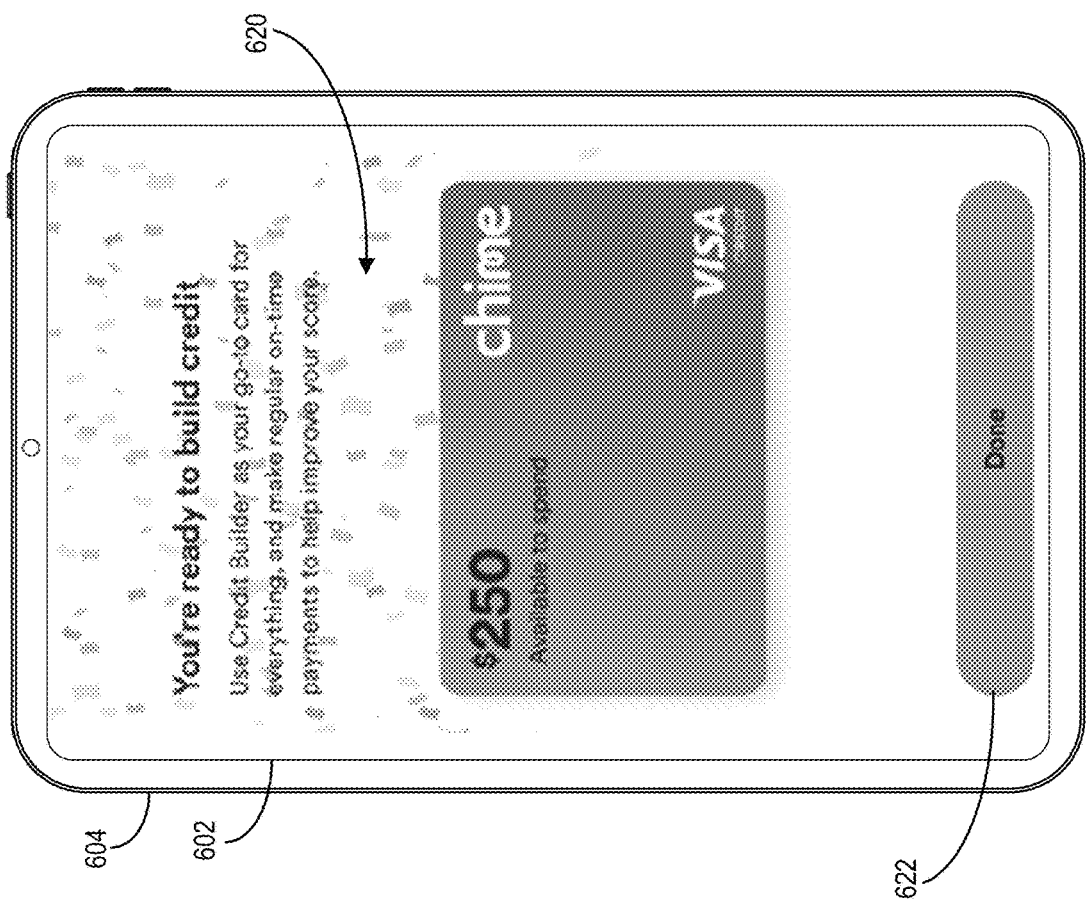
Figure 6C:
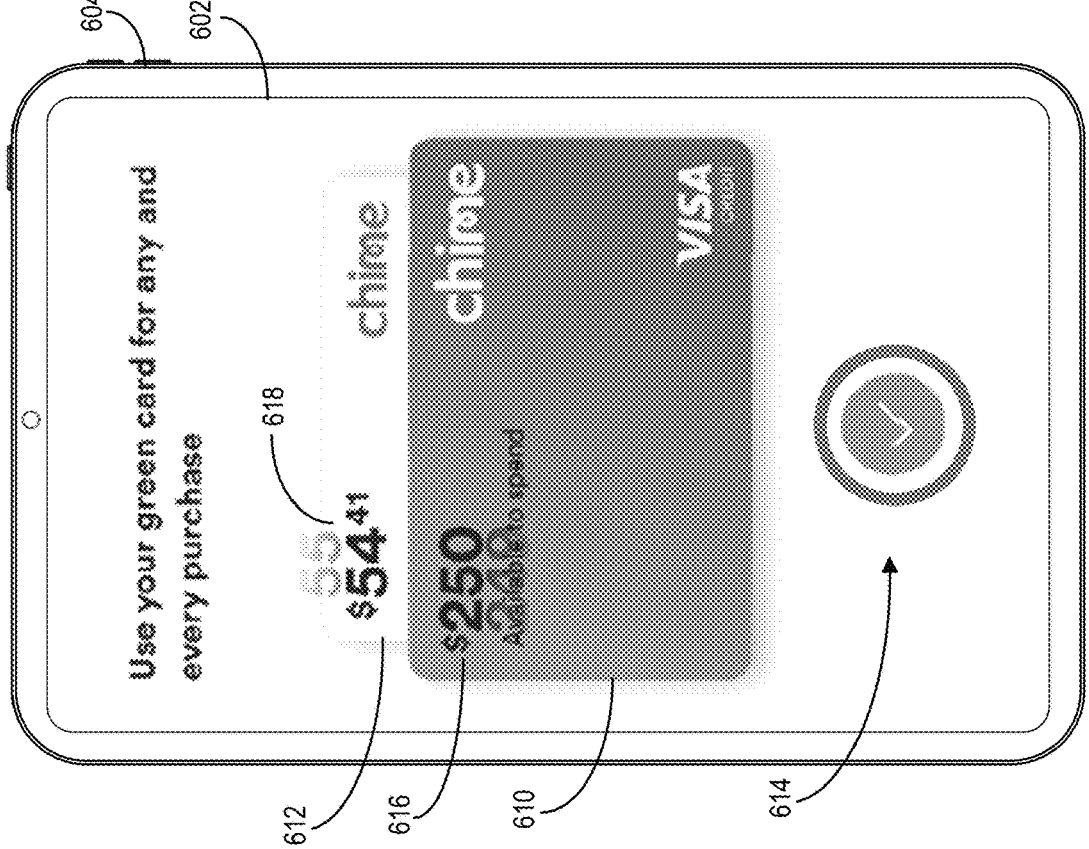

FIG. 6C illustrates an additional visual animation provided by the account builder system 106 for display within the graphical user interface 602. In particular, the visual animation shows an update to a balance 616 of the account being funded and a balance 618 of the account from which the funds are transferred. Indeed, in one or more embodiments, the visual animation includes a plurality of animation frames that illustrate the update of the balances 616, 618 (e.g., a number representing the transfer amount moving from the visual element 612 to the visual element 610 and the numbers associated with the balances 616, 618 decreasing or increasing accordingly). As further, shown in FIG. 6C, the account builder system 106 can update the visual indicator 614 to indicate that the transfer has been complete.

FIG. 6D illustrates an additional visual animation provided by the account builder system 106 for display based on completion of the transfer of funds. In particular, the account builder system 106 provides the visual element 610 including the balance 616 after having been updated in response to the transfer of funds. The account builder system 106 further provides an animated element 620 (e.g., confetti) indicating the account is ready to use the funds that have been transferred. Further, the account builder system 106 provides a selectable option 622 for exiting the display provided in the graphical user interface 602 (e.g., returning to a home screen view).

As indicated, the account builder system 106 further provides options for modifying the transfer amounts associated with presented funding options. For instance, FIG. 7A illustrates a graphical user interface 702 displayed on a client device 704 with a funding option 706 for funding an account by transferring funds to the account from another account associated with the user. The account builder system 106 further provides, for display within the graphical user interface 702, a transfer amount 708 (e.g., the suggested transfer amount or a transfer amount previously selected by the user) for the funding option 706 as well as a selectable option 710 for editing the transfer amount 708.

As illustrated by FIG. 7B, in response to detecting a selection of the selectable option 710, the account builder system 106 provides selectable options 712a-712d for choosing a transfer amount to fund the account. In one or more embodiments, the account builder system 106 determines the transfer amounts associated with the selectable options 712a-712d based on a current balance of the other account from which the funds are to be transferred. For instance, in some cases, the selectable option 712d corresponds to the full current balance of the other account (e.g., rounded down to the nearest whole-unit value). The other selectable options 712a-712c can correspond to other percentages of the current balance of the other account.

As shown in FIG. 7B, the account builder system 106 provides a visual element 714 for the account to receive the funds and a visual element 716 for the other account from which the funds are to be transferred. The account builder system 106 further provides a balance 718 for the account and a balance 720 for the other account that would result from the transfer. Accordingly, the account builder system 106 can modify the balances 718, 720 shown to reflect selections among the various selectable options 712a-712c.

Additionally, as shown, the account builder system 106 provides a selectable option 722 for accepting the transfer amount associated with the selectable option that has been selected. Based on selection of the selectable option 722, the account builder system 106 can update the transfer amount 708 shown in FIG. 7A to reflect a change in the amount to be transferred. The account builder system 106 also provides a selectable option 724 for skipping the transfer amount selection process.

Figure 7C:
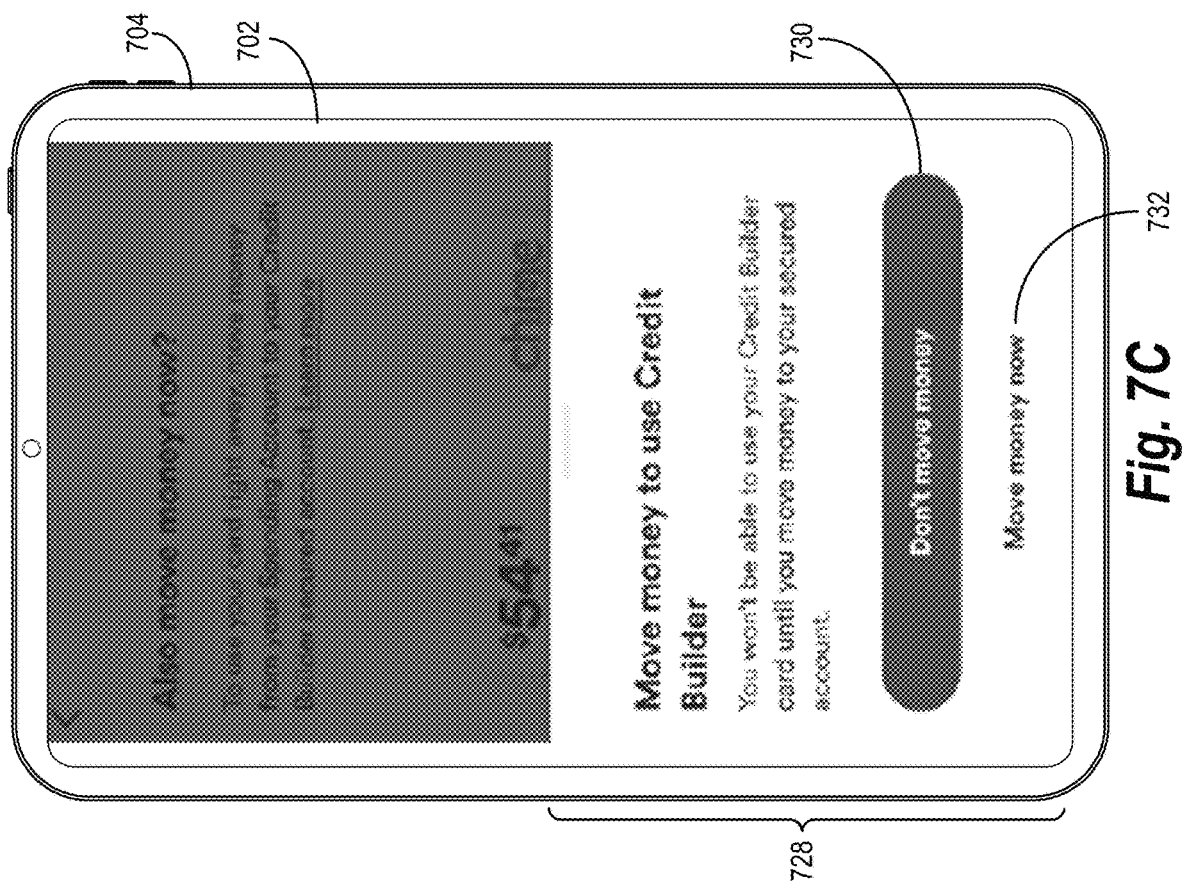

As shown in FIG. 7C, based on selection of the selectable option 724, the account builder system 106 provides a confirmation window 728 within the graphical user interface 702. The confirmation window 728 includes a selectable option 730 for confirming a selection to skip the transfer amount selection process. Based on detecting a selection of the selectable option 730, the account builder system 106 can return the display of the graphical user interface 702 to that shown in FIG. 7A. The confirmation window 728 further includes a selectable option 732 for continuing the transfer amount selection process. In particular, based on detecting a selection of the selectable option 732, the account builder system 106 can remove the confirmation window 728, returning the display of the graphical user interface 702 to that shown in FIG. 7B.

Though not shown, in some cases, the account builder system 106 further provides other selectable options for configuring the funding option that funds an account using funds transferred directly from another account. For example, in some cases, the account builder system 106 provides options for selecting the other account for which the funds are to be transferred. Further the account builder system 106 can provide one or more selectable options for choosing a frequency to which the funding option applies (e.g., transfer funds once a month).

Figures 8A, 8B:
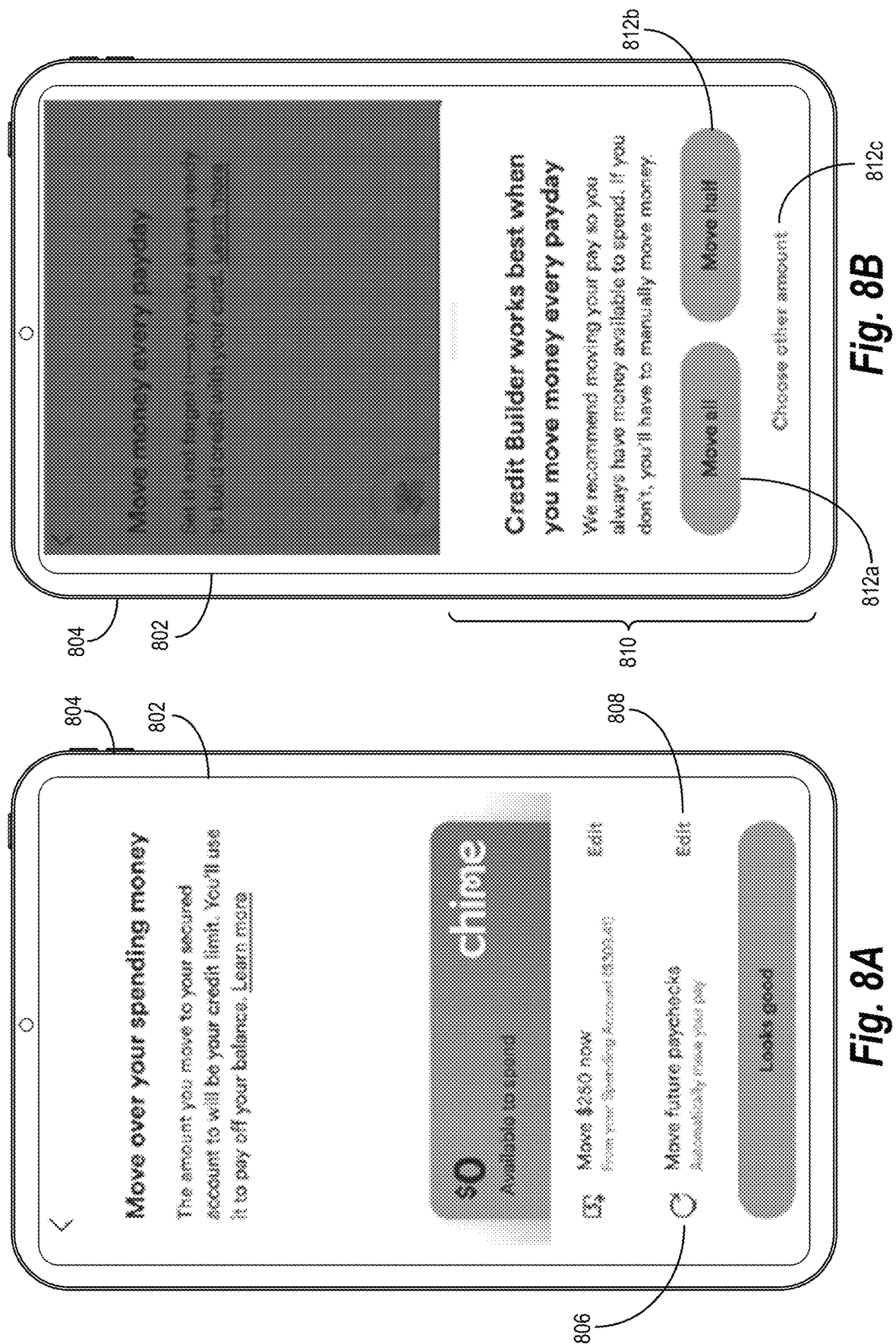
FIGS. 8A-8D illustrate a graphical user interfaced utilized by the account builder system to edit another funding option for funding an account in accordance with one or more embodiments.

FIG. 8A illustrates a graphical user interface 802 displayed on a client device 804 with a funding option 806 for funding an account by transferring funds using funds deposited into another account via a direct deposit feature (e.g., funds from one or more paychecks that will be deposited in the future). The account builder system 106 further provides a selectable option 808 for editing a transfer amount associated with the funding option 806.

FIG. 8B illustrates that, based on selection of the selectable option 808, the account builder system 106 provides a funding amount window 810 for display in the graphical user interface 802. The funding amount window 810 includes a selectable option 812a for transferring the entirety of the funds of each direct deposit into the account, a selectable option 812b for transferring half of the funds of each direct deposit into the account, and a selectable option 812c for transferring a different portion of each direct deposit into the account.

Figure 8D:
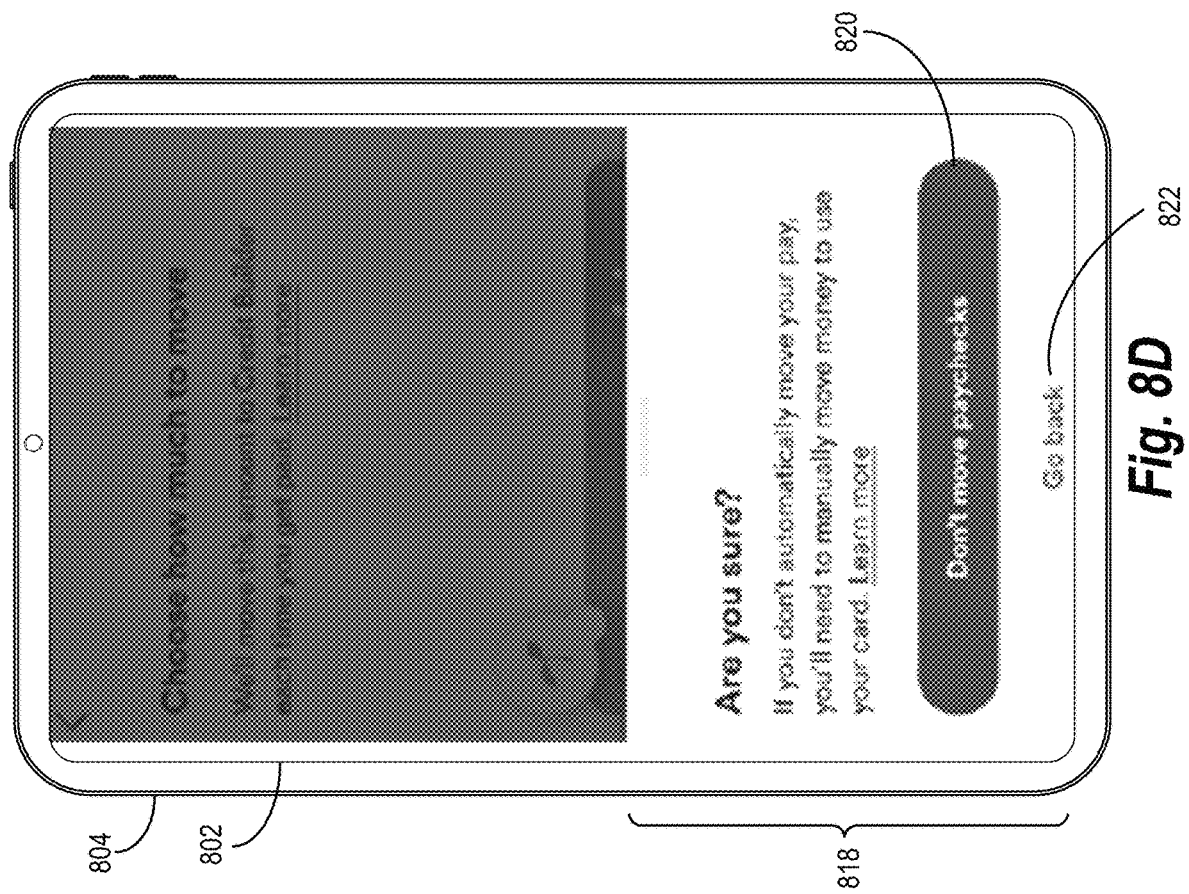
Figure 8C:
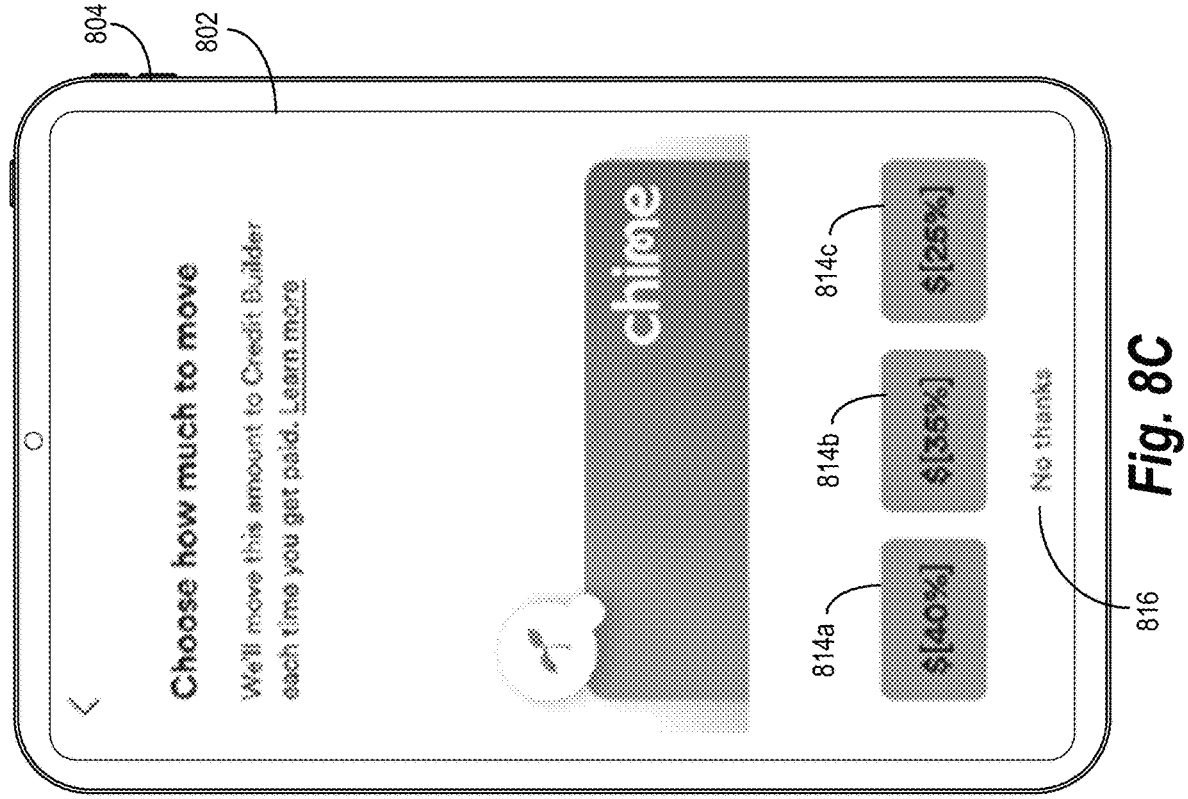

FIG. 8C illustrates that, based on selection of the selectable option 812c, the account builder system 106 provides selectable options 814a-814c for choosing a transfer amount to fund the account via funds deposited into the other account via direct deposit. As shown, the account builder system 106 can provide various percentage options in association with the selectable options 814a-814c. In one or more embodiments, the account builder system 106 determines the transfer amounts associated with the selectable options 814a-814c based on one or more user characteristics associated with the user of the account, as will be discussed below with reference to FIGS. 9A-9B. In some cases, the number of selectable options presented vary based on the user characteristics. For example, based on determining that the user would prefer a particular transfer amount with high confidence, the account builder system 106 can provide a single selectable option associated with that transfer amount. As shown in FIG. 8C, the account builder system 106 further provides a selectable option 816 for skipping the transfer amount selection process.

As shown in FIG. 8D, based on selection of the selectable option 816, the account builder system 106 provides a confirmation window 818 within the graphical user interface 802. The confirmation window 818 includes a selectable option 820 for confirming a selection to skip the transfer amount selection process. Based on detecting a selection of the selectable option 820, the account builder system 106 can return the display of the graphical user interface 802 to that shown in FIG. 8A. The account builder system 106 can further set the amount to transfer to the account via the funds deposited into the other account via direct deposit to zero (or some other default value). The confirmation window 818 further includes a selectable option 822 for continuing the transfer amount selection process. In particular, based on detecting a selection of the selectable option 822, the account builder system 106 can remove the confirmation window 818, returning the display of the graphical user interface 802 to that shown in FIG. 8C.

Though not shown, in some cases, the account builder system 106 further provides other selectable options for configuring the funding option that funds an account using funds deposited into another account via a direct deposit feature. For example, the account builder system 106 can provide one or more selectable options for choosing a frequency to which the funding option applies (e.g., transfer funds from every other direct deposit) or a length of time the funding option applies (e.g., transfer funds from direct deposit for a selected number of months).

Figure 9A:
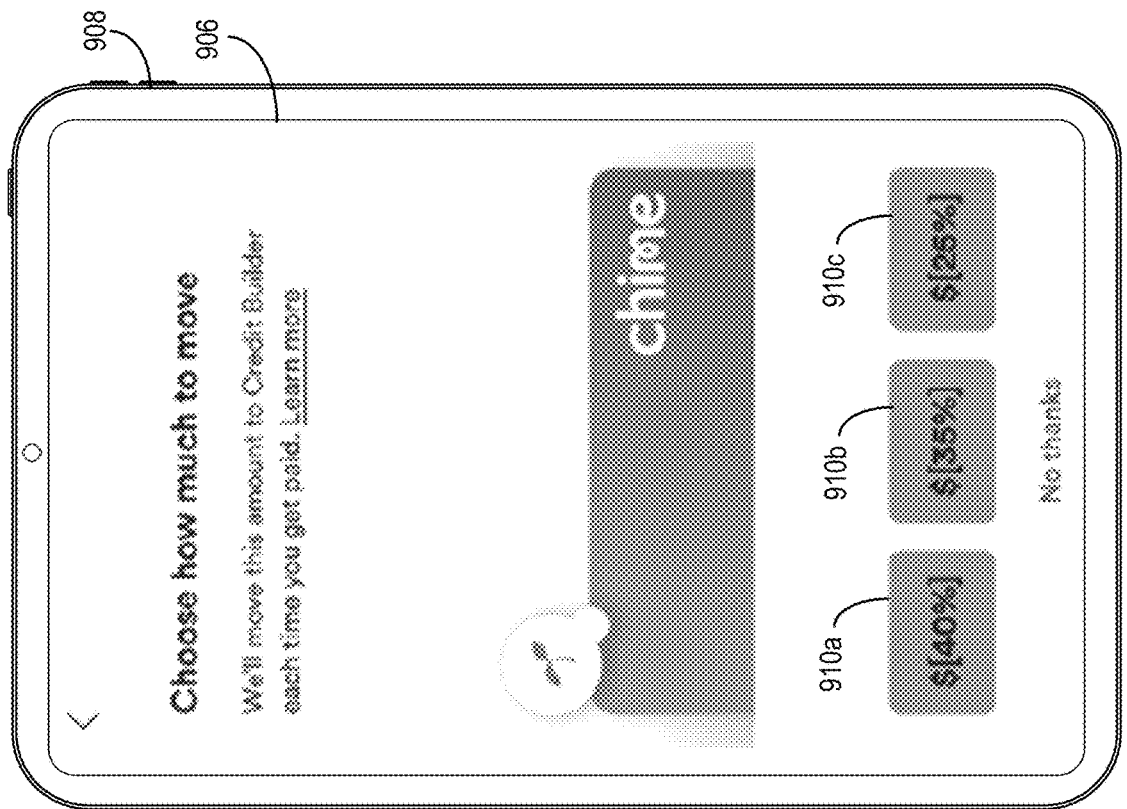
FIGS. 9A-9B illustrate determining suggested transfer amounts to provide in association with a funding option for transferring, into an account, a portion of funds deposited into another account via a direct deposit feature in accordance with one or more embodiments.
Figure 9A:
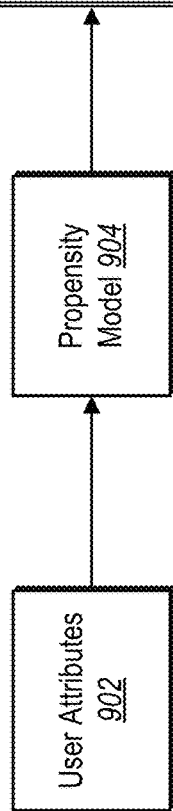
Figure 9B:
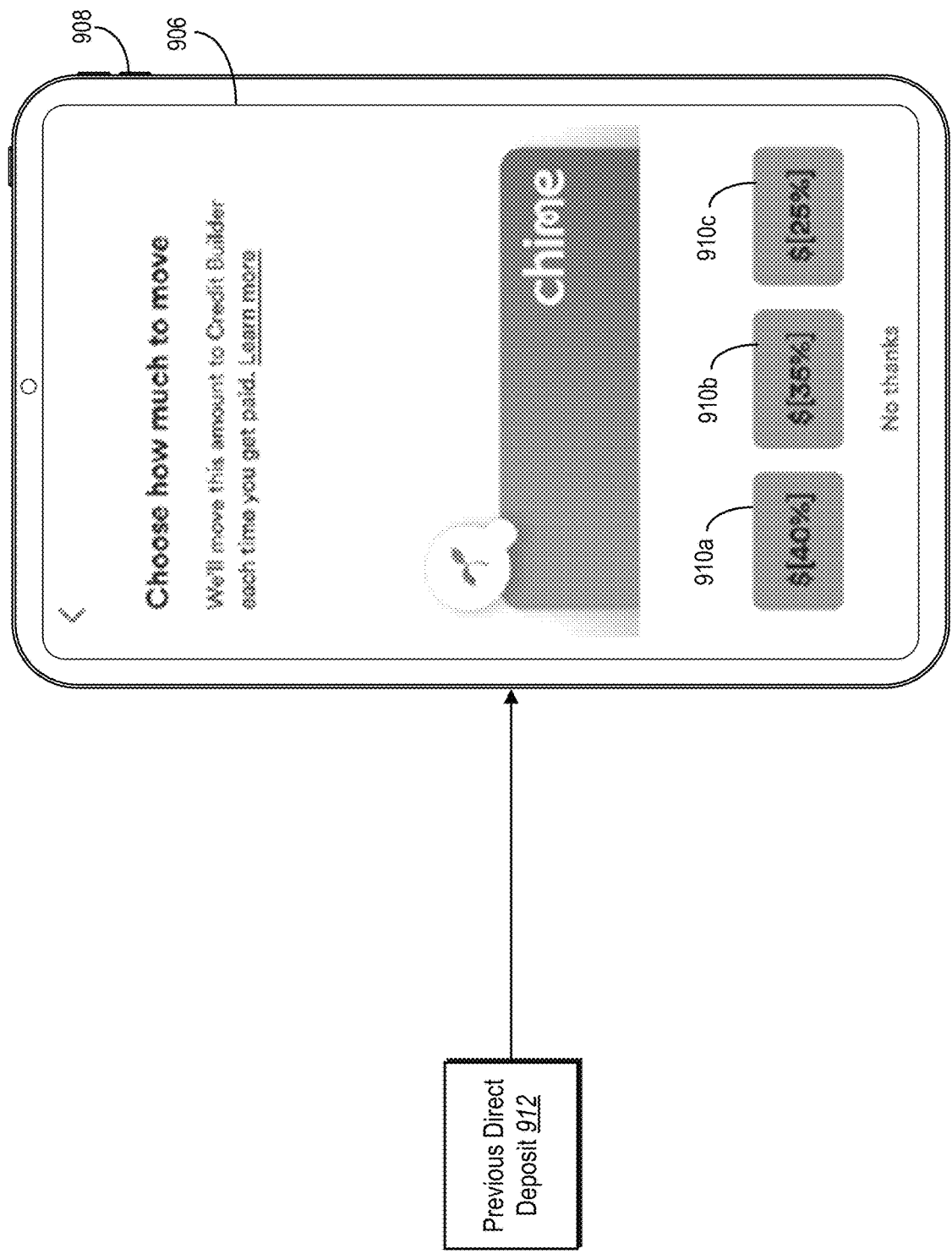

As mentioned, the account builder system 106 can determine suggested transfer amounts for one or more of the funding options presented via a graphical user interface. FIGS. 9A-9B illustrate block diagrams for determining suggested transfer amounts in accordance with one or more embodiments. In particular, FIGS. 9A-9B illustrate determining suggested transfer amounts to provide in association with a funding option for transferring, into an account, a portion of funds deposited into another account via a direct deposit feature in accordance with one or more embodiments. It should be understood, however, that the account builder system 106 can similarly determine one or more suggested funding amounts to provide in association with a funding option for directly transferring funds to an account from another account.

In particular, FIG. 9A illustrates determining suggested transfer amounts using a propensity model 904 based on user characteristics associated with the user of the account to be funded. Indeed, in one or more embodiments, the account builder system 106 utilizes the propensity model 904 to analyze the user characteristics 902. The account builder system 106 determines the suggested transfer amounts based on the results of the analysis. As shown in FIG. 9A, the account builder system 106 provides selectable options 910a-910c corresponding to the determined suggested transfer amounts for display within a graphical user interface 906 of a client device 908.

To provide an illustration, in some embodiments, the account builder system 106 utilizes the propensity model 904 to determine a propensity (e.g., a classification) of the user that indicates one or more transfer amounts that the user would be likely to select or a transfer amount that the user would prefer. The account builder system 106 can provide selectable options suggesting these transfer amounts to the user. In some cases, if the determined propensity of the use indicates that the user is highly likely to select a particular transfer amount, the account builder system 106 can provide a single selectable option suggesting this transfer amount.

As mentioned, in some cases, the propensity model 904 includes a machine learning model. Accordingly, in some cases, the account builder system 106 trains the propensity model 904 based on training data and ground truths that result from previous selections for transfer amounts by users. For instance, the account builder system 106 can provide one or more suggested transfer amounts to a plurality of users and record their selections. Accordingly, the account builder system 106 can utilize the selections as ground truths, determining that a user having a particular set of user characteristics is likely to select a particular transfer amount. The account builder system 106 can then train the propensity model 904 by predicting which transfer amount a user having a set of user characteristics would select, comparing the prediction to a corresponding ground truth, and modifying parameters of the propensity model 904 based on the error determined from the comparison.

FIG. 9B illustrates utilizing a particular user characteristic—a previous direct deposit 912—to determine one or more suggested transfer amounts. In particular, the account builder system 106 can utilize an amount deposited via direct deposit to determine the one or more suggested transfer amounts. For example, the account builder system 106 can suggest a larger transfer amount if the previous direct deposit 912 was relatively large or a smaller transfer amount if the previous direct deposit 912 was relatively small.

By determining and providing suggested transfer amounts, the account builder system 106 provides further efficiency improvements when compared to conventional network transaction systems. Indeed, the account builder system 106 determines the transfer amounts that a user would likely prefer or transfer amounts that would be optimal for the user. Accordingly, the account builder system 106 reduces the amount of user interactions that may be required under conventional network transaction systems where a user who is unsure of a transfer amount to use repeatedly modifies the selected transfer amount until the selected amount is satisfactory.

Figure 10:
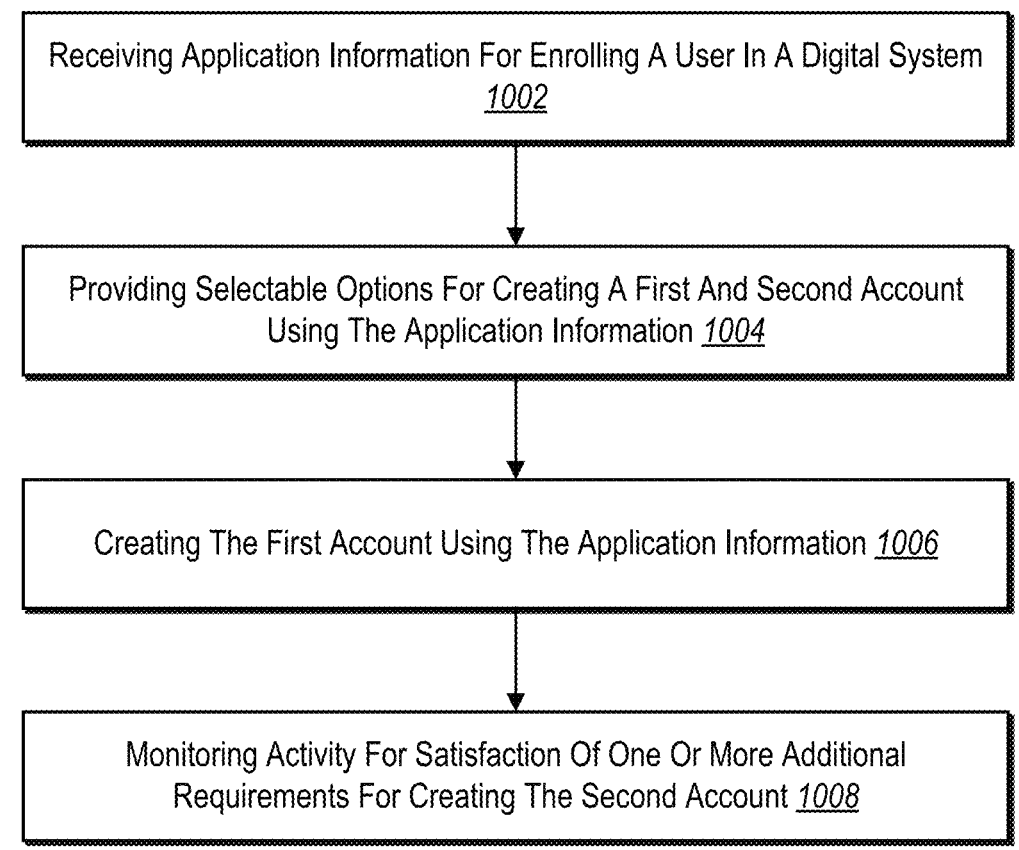
FIG. 10 illustrates a flowchart of a series of acts for utilizing a graphical user interface to facilitate simultaneous application for multiple accounts of a digital system in accordance with one or more embodiments.
Figure 11:
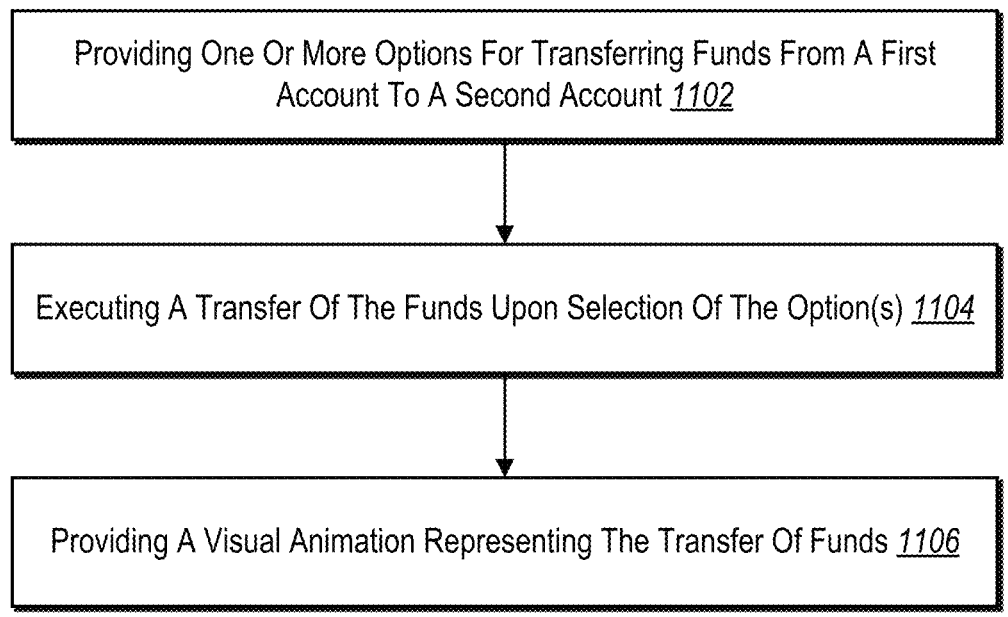
FIG. 11 illustrates a flowchart of a series of acts for utilizing a graphical user interface to facilitate funding of an account of a digital system in accordance with one or more embodiments.

FIGS. 1-9B, the corresponding text and the examples provide a number of different methods, systems, devices, and non-transitory computer-readable media of the account builder system 106. In addition to the foregoing, one or more embodiments can also be described in terms of flowcharts comprising acts for accomplishing particular results, as shown in FIGS. 10-11. FIGS. 10-11 may be performed with more or fewer acts. Further, the acts may be performed in different orders. Additionally, the acts described herein may be repeated or performed in parallel with one another or in parallel with different instances of the same or similar acts.

FIG. 10 illustrates a flowchart of a series of acts 1000 for utilizing a graphical user interface to facilitate simultaneous application for multiple accounts of a digital system in accordance with one or more embodiments. FIG. 10 illustrates acts according to one embodiment, but alternative embodiments may omit, add to, reorder, and/or modify any of the acts shown in FIG. 10. In some implementations, the acts of FIG. 10 are performed as part of a method. For example, in some embodiments, the acts of FIG. 10 are performed as part of a computer-implemented method. Alternatively, a non-transitory computer-readable medium can store instructions thereon that, when executed by at least one processor, cause a computing device to perform the acts of FIG. 10. In some embodiments, a system performs the acts of FIG. 10. For example, in one or more embodiments, a system includes at least one processor. The system further includes a non-transitory computer-readable medium comprising instructions that, when executed by the at least one processor, cause the system to perform the acts of FIG. 10.

The series of acts 1000 includes an act 1002 of receiving application information for enrolling a user in a digital system. For example, in one or more embodiments, the act 1002 involves receiving, from a client device, application information in association with enrollment of a user in a digital system. In some cases, receiving the application information from the client device comprises receiving private security information associated with the user enrolling in the digital system.

The series of acts 1000 also includes an act 1004 of providing selectable options for creating a first and second account using the application information. For instance, in some cases, the act 1004 involves providing, for display within a graphical user interface of the client device, one or more selectable options for creating a first account and a second account for the digital system utilizing the application information.

In some cases, based on detecting a user selection of the one or more selectable options via the graphical user interface and before deleting the private security information, the account builder system 106 further generates a first request for verifying an identity of the user using the private security information, the first request corresponding to creation of the first account; and generates a second request for verifying the identity of the user using the private security information, the second request corresponding to creation of the second account.

Additionally, the series of acts 1000 includes an act 1006 of creating the first account using the application information. For example, in some implementations, the act 1006 involves, based on detecting user selection of the one or more selectable options via the graphical user interface, creating the first account for the digital system utilizing the application information. In one or more embodiments, based on creating the first account, the account builder system 106 provides, for display within the graphical user interface of the client device, one or more additional selectable options for activating a direct deposit feature for the first account.

Further, the series of acts 1000 includes an act 1008 of monitoring activity for satisfaction of one or more additional requirements for creating the second account. For instance, in some embodiments, the 1008 involves, based on detecting user selection of the one or more selectable options via the graphical user interface, further monitoring activity of the user with respect to the digital system, within a threshold time period, for one or more activities that satisfy one or more additional application requirements for creating the second account using the application information. In one or more embodiments, monitoring the activity of the user with respect to the digital system, within the threshold time period, for the one or more activities that satisfy the one or more additional application requirements for creating the second account using the application information comprises monitoring direct deposit activity to determine whether an amount of funds directly deposited into the first account satisfies a direct deposit threshold within the threshold time period.

In some cases, the account builder system 106 further provides, to the client device, a notification indicating that the one or more additional application requirements for creating the second account need to be satisfied before the second account is created.

In one or more embodiments, the series of acts 1000 further includes acts for creating or cancelling creation of the second account. For example, in some embodiments, the acts include identifying the one or more activities that satisfy the one or more additional application requirements within the threshold time period; and creating, based on identifying the one or more activities, the second account using the application information. In contrast, in some cases, the acts include determining a failure of the activity of the user with respect to the digital system to satisfy the one or more additional application requirements for creating the second account within the threshold time period; and cancelling creation of the second account based on determining the failure of the activity to satisfy the one or more additional application requirements. In some cases, the account builder system 106 receives, after cancelling the creation of the second account, a request to create the second account, the request comprising additional application information; and creates the second account based on identifying the one or more activities that satisfy the one or more additional application requirements.

FIG. 11 illustrates a flowchart of a series of acts 1100 for utilizing a graphical user interface to facilitate funding of an account of a digital system in accordance with one or more embodiments. FIG. 11 illustrates acts according to one embodiment, but alternative embodiments may omit, add to, reorder, and/or modify any of the acts shown in FIG. 11. In some implementations, the acts of FIG. 11 are performed as part of a method. For example, in some embodiments, the acts of FIG. 11 are performed as part of a computer-implemented method. Alternatively, a non-transitory computer-readable medium can store instructions thereon that, when executed by at least one processor, cause a computing device to perform the acts of FIG. 11. In some embodiments, a system performs the acts of FIG. 11. For example, in one or more embodiments, a system includes at least one processor. The system further includes a non-transitory computer-readable medium comprising instructions that, when executed by the at least one processor, cause the system to perform the acts of FIG. 11.

The series of acts 1100 includes an act 1102 of providing one or more options for transferring funds from a first account to a second account. For example, in one or more embodiments, the act 1102 involves providing, for display within a graphical user interface of a client device, one or more selectable options for transferring funds associated with a first account of a user of a digital system to a second account of the user of the digital system.

In one or more embodiments, the account builder system 106 determines a suggested transfer amount for transferring the funds associated with the first account to the second account by determining a portion of a current balance of the first account to transfer to the second account by applying a percentage value to the current balance; and provides the one or more selectable options for display within the graphical user interface of the client device by providing a selectable option that corresponds to the suggested transfer amount.

The series of acts 1100 also includes an act 1104 of executing a transfer of the funds based on selection of the option(s). For instance, in some embodiments, the act 1104 involves executing a transfer of the funds from the first account to the second account in response to detecting user selection of the one or more selectable options via the graphical user interface.

In some embodiments, the account builder system 106 provides the one or more selectable options for transferring the funds for display within the graphical user interface of the client device by providing a selectable option for transferring a suggested transfer amount shown in association with the selectable option from the first account to the second account; and executes the transfer of the funds from the first account to the second account in response to detecting the user selection of the one or more selectable options via the graphical user interface by executing a transfer of the suggested transfer amount shown in association with the selectable option from the first account to the second account in response to detecting the user selection of the selectable option via the graphical user interface.

Further, the series of acts 1100 includes an act 1106 of providing a visual animation representing the transfer of funds. To illustrate, in some cases, the act 1106 involves providing, for display within the graphical user interface of the client device, a visual animation representing the transfer of the funds from the first account to the second account.

In one or more embodiments, the account builder system 106 provides the visual animation representing the transfer of the funds from the first account to the second account by: generating, for display within the graphical user interface of the client device, a first visual element corresponding to the first account and comprising a first visual indication of a balance of the first account; generating, for display within the graphical user interface of the client device, a second visual element corresponding to the second account and comprising a second visual indication of a balance of the second account; and providing a plurality of animation frames that update the balance of the first account and the balance of the second account in accordance with the transfer of the funds from the first account to the second account.

In some cases, the series of acts 1100 also includes acts for funding the first account via a direct deposit feature. For instance, in some implementations, the acts include providing, for display within the graphical user interface of the client device, one or more additional selectable options for transferring a portion of direct deposits for the first account into the second account. In one or more embodiments, the account builder system 106 determines, utilizing a propensity model, one or more suggested transfer amounts for the direct deposits for the first account into the second account based on one or more user characteristics associated with the user of the digital system; and provides the one or more additional selectable options for display within the graphical user interface of the client device by providing the one or more additional selectable options that correspond to the one or more suggested transfer amounts. In some cases, the account builder system 106 determines one or more suggested transfer amounts for the direct deposits for the first account into the second account based a previous direct deposit amount; and provides the one or more additional selectable options for display within the graphical user interface of the client device by providing the one or more additional selectable options that correspond to the one or more suggested transfer amounts.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, based on reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 12:
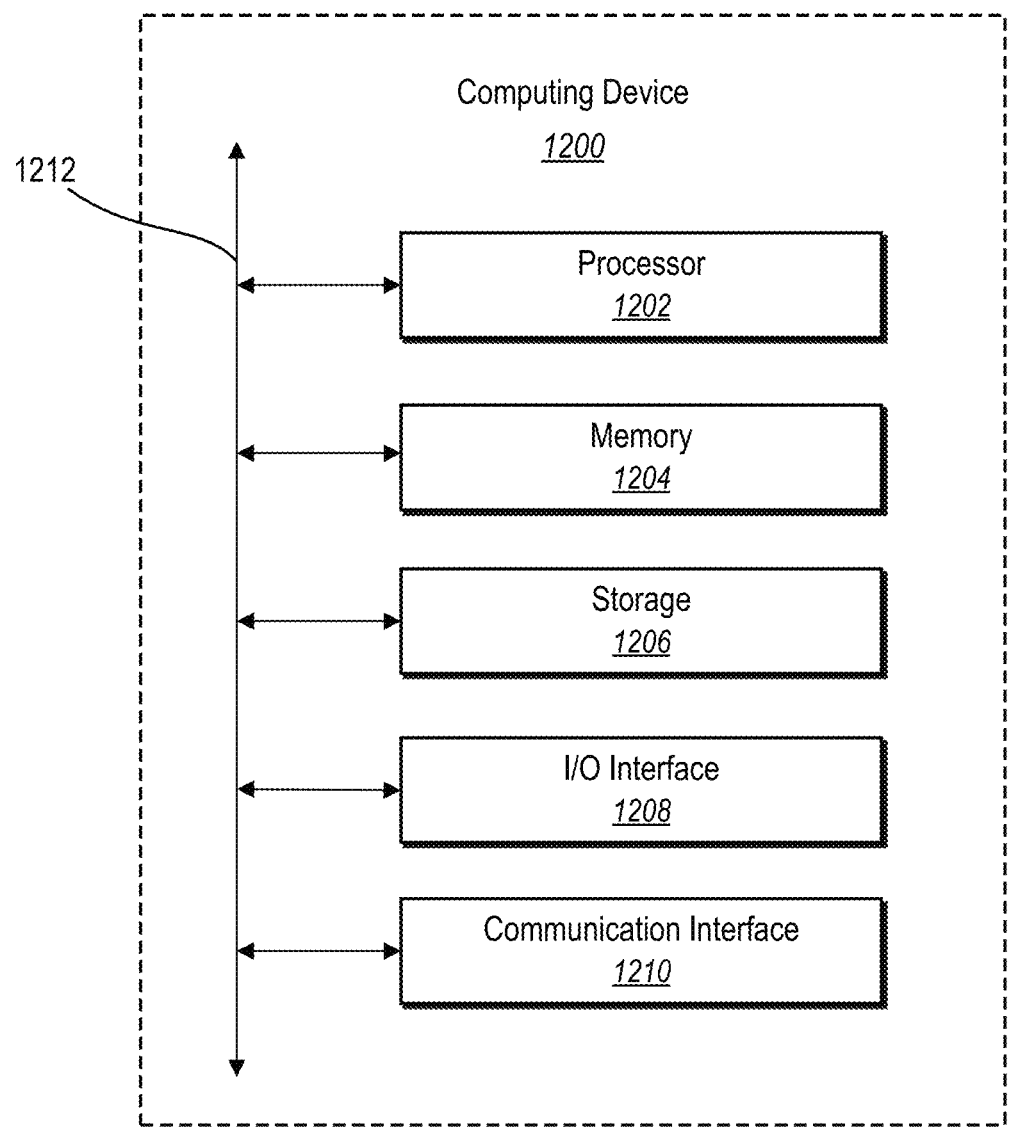
FIG. 12 illustrates a block diagram of an exemplary computing device in accordance with one or more embodiments.

FIG. 12 illustrates a block diagram of an example computing device 1200 that may be configured to perform one or more of the processes described above. One will appreciate that one or more computing devices, such as the computing device 1200 may represent the computing devices described above (e.g., the server(s) 102, the client devices 110*a*-110*n*, and/or the third-party server 114). In one or more embodiments, the computing device 1200 may be a mobile device (e.g., a mobile telephone, a smartphone, a PDA, a tablet, a laptop, a camera, a tracker, a watch, a wearable device). In some embodiments, the computing device 1200 may be a non-mobile device (e.g., a desktop computer or another type of client device). Further, the computing device 1200 may be a server device that includes cloud-based processing and storage capabilities.

As shown in FIG. 12, the computing device 1200 can include one or more processor(s) 1202, memory 1204, a storage device 1206, input/output interfaces 1208 (or "I/O interfaces 1208"), and a communication interface 1210, which may be communicatively coupled by way of a communication infrastructure (e.g., bus 1212). While the computing device 1200 is shown in FIG. 12, the components illustrated in FIG. 12 are not intended to be limiting. Additional or alternative components may be used in other embodiments. Furthermore, in certain embodiments, the computing device 1200 includes fewer components than those shown in FIG. 12. Components of the computing device 1200 shown in FIG. 12 will now be described in additional detail.

In particular embodiments, the processor(s) 1202 includes hardware for executing instructions, such as those making up a computer program. As an example, and not by way of limitation, to execute instructions, the processor(s) 1202 may retrieve (or fetch) the instructions from an internal register, an internal cache, memory 1204, or a storage device 1206 and decode and execute them.

The computing device 1200 includes memory 1204, which is coupled to the processor(s) 1202. The memory 1204 may be used for storing data, metadata, and programs for execution by the processor(s). The memory 1204 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1204 may be internal or distributed memory.

The computing device 1200 includes a storage device 1206 including storage for storing data or instructions. As an example, and not by way of limitation, the storage device 1206 can include a non-transitory storage medium described above. The storage device 1206 may include a hard disk drive (HDD), flash memory, a Universal Serial Bus (USB) drive or a combination these or other storage devices.

As shown, the computing device 1200 includes one or more I/O interfaces 1208, which are provided to allow a user to provide input to (such as user strokes), receive output from, and otherwise transfer data to and from the computing device 1200. These I/O interfaces 1208 may include a mouse, keypad or a keyboard, a touch screen, camera, optical scanner, network interface, modem, other known I/O devices or a combination of such I/O interfaces 1208. The touch screen may be activated with a stylus or a finger.

The I/O interfaces 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1208 are configured to provide graphical data to a display for presentation to a user. The graphical data may be representative of one or more graphical user interfaces and/or any other graphical content as may serve a particular implementation.

The computing device 1200 can further include a communication interface 1210. The communication interface 1210 can include hardware, software, or both. The communication interface 1210 provides one or more interfaces for communication (such as, for example, packet-based communication) between the computing device and one or more other computing devices or one or more networks. As an example, and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI. The computing device 1200 can further include a bus 1212. The bus 1212 can include hardware, software, or both that connects components of computing device 1200 to each other.

In the foregoing specification, the invention has been described with reference to specific example embodiments thereof. Various embodiments and aspects of the invention (s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
   providing, for display within a graphical user interface of a client device, one or more selectable options for transferring funds associated with a first account of a user of a digital system to a second account of the user of the digital system;
   executing a transfer of the funds from the first account to the second account in response to detecting user selection of the one or more selectable options via the graphical user interface; and
   providing, for display within the graphical user interface of the client device, a visual animation representing the transfer of the funds from the first account to the second account.

2. The computer-implemented method of claim 1, wherein providing the visual animation representing the transfer of the funds from the first account to the second account comprises:
   generating, for display within the graphical user interface of the client device, a first visual element corresponding to the first account and comprising a first visual indication of a balance of the first account;
   generating, for display within the graphical user interface of the client device, a second visual element corresponding to the second account and comprising a second visual indication of a balance of the second account; and
   providing a plurality of animation frames that update the balance of the first account and the balance of the second account in accordance with the transfer of the funds from the first account to the second account.

3. The computer-implemented method of claim 1, further comprising providing, for display within the graphical user interface of the client device, one or more additional selectable options for transferring a portion of direct deposits for the first account into the second account.

4. The computer-implemented method of claim 3, further comprising:
   further comprising determining, utilizing a propensity model, one or more suggested transfer amounts for the direct deposits for the first account into the second account based on one or more user characteristics associated with the user of the digital system,
   wherein providing the one or more additional selectable options for display within the graphical user interface of the client device comprises providing the one or more additional selectable options that correspond to the one or more suggested transfer amounts.

5. The computer-implemented method of claim 3,
   further comprising determining one or more suggested transfer amounts for the direct deposits for the first account into the second account based a previous direct deposit amount; and
   wherein providing the one or more additional selectable options for display within the graphical user interface of the client device comprises providing the one or more additional selectable options that correspond to the one or more suggested transfer amounts.

6. The computer-implemented method of claim 1,
   further comprising determining a suggested transfer amount for transferring the funds associated with the first account to the second account by determining a portion of a current balance of the first account to transfer to the second account by applying a percentage value to the current balance,
   wherein providing the one or more selectable options for display within the graphical user interface of the client device comprises providing a selectable option that corresponds to the suggested transfer amount.

7. The computer-implemented method of claim 1, wherein:
   providing the one or more selectable options for transferring the funds for display within the graphical user interface of the client device comprises providing a selectable option for transferring a suggested transfer amount shown in association with the selectable option from the first account to the second account; and
   executing the transfer of the funds from the first account to the second account in response to detecting the user selection of the one or more selectable options via the graphical user interface comprises executing a transfer of the suggested transfer amount shown in association with the selectable option from the first account to the second account in response to detecting the user selection of the selectable option via the graphical user interface.

8. A non-transitory computer-readable medium storing instructions thereon that, when executed by at least one processor, cause a computing device to:
   provide, for display within a graphical user interface of a client device, one or more selectable options for transferring funds associated with a first account of a user of a digital system to a second account of the user of the digital system;
   execute a transfer of the funds from the first account to the second account in response to detecting user selection of the one or more selectable options via the graphical user interface; and
   provide, for display within the graphical user interface of the client device, a visual animation representing the transfer of the funds from the first account to the second account.

9. The non-transitory computer-readable medium of claim 8, further comprising instructions that, when executed by the at least one processor, cause the computing device to provide the visual animation representing the transfer of the funds from the first account to the second account by:
   generating, for display within the graphical user interface of the client device, a first visual element corresponding to the first account and comprising a first visual indication of a balance of the first account;

generating, for display within the graphical user interface of the client device, a second visual element corresponding to the second account and comprising a second visual indication of a balance of the second account; and providing a plurality of animation frames that update the balance of the first account and the balance of the second account in accordance with the transfer of the funds from the first account to the second account.

10. The non-transitory computer-readable medium of claim 8, further comprising instructions that, when executed by the at least one processor, cause the computing device to provide, for display within the graphical user interface of the client device, one or more additional selectable options for transferring a portion of direct deposits for the first account into the second account.

11. The non-transitory computer-readable medium of claim 10, further comprising instructions that, when executed by the at least one processor, cause the computing device to:
 determine, utilizing a propensity model, one or more suggested transfer amounts for the direct deposits for the first account into the second account based on one or more user characteristics associated with the user of the digital system; and
 provide the one or more additional selectable options for display within the graphical user interface of the client device by providing the one or more additional selectable options that correspond to the one or more suggested transfer amounts.

12. The non-transitory computer-readable medium of claim 10, further comprising instructions that, when executed by the at least one processor, cause the computing device to:
 determine one or more suggested transfer amounts for the direct deposits for the first account into the second account based a previous direct deposit amount; and
 provide the one or more additional selectable options for display within the graphical user interface of the client device by providing the one or more additional selectable options that correspond to the one or more suggested transfer amounts.

13. The non-transitory computer-readable medium of claim 8, further comprising instructions that, when executed by the at least one processor, cause the computing device to:
 determine a suggested transfer amount for transferring the funds associated with the first account to the second account by determining a portion of a current balance of the first account to transfer to the second account by applying a percentage value to the current balance; and
 provide the one or more selectable options for display within the graphical user interface of the client device by providing a selectable option that corresponds to the suggested transfer amount.

14. The non-transitory computer-readable medium of claim 8, further comprising instructions that, when executed by the at least one processor, cause the computing device to:
 provide the one or more selectable options for transferring the funds for display within the graphical user interface of the client device by providing a selectable option for transferring a suggested transfer amount shown in association with the selectable option from the first account to the second account; and
 execute the transfer of the funds from the first account to the second account in response to detecting the user selection of the one or more selectable options via the graphical user interface by executing a transfer of the suggested transfer amount shown in association with the selectable option from the first account to the second account in response to detecting the user selection of the selectable option via the graphical user interface.

15. A system comprising:
at least one processor; and
a non-transitory computer-readable medium comprising instructions that, when executed by the at least one processor, cause the system to:
 provide, for display within a graphical user interface of a client device, one or more selectable options for transferring funds associated with a first account of a user of a digital system to a second account of the user of the digital system;
 execute a transfer of the funds from the first account to the second account in response to detecting user selection of the one or more selectable options via the graphical user interface; and
 provide, for display within the graphical user interface of the client device, a visual animation representing the transfer of the funds from the first account to the second account.

16. The system of claim 15, further comprising instructions that, when executed by the at least one processor, cause the system to provide the visual animation representing the transfer of the funds from the first account to the second account by:
 generating, for display within the graphical user interface of the client device, a first visual element corresponding to the first account and comprising a first visual indication of a balance of the first account;
 generating, for display within the graphical user interface of the client device, a second visual element corresponding to the second account and comprising a second visual indication of a balance of the second account; and
 providing a plurality of animation frames that update the balance of the first account and the balance of the second account in accordance with the transfer of the funds from the first account to the second account.

17. The system of claim 15, further comprising instructions that, when executed by the at least one processor, cause the system to provide, for display within the graphical user interface of the client device, one or more additional selectable options for transferring a portion of direct deposits for the first account into the second account.

18. The system of claim 17, further comprising instructions that, when executed by the at least one processor, cause the system to:
 determine, utilizing a propensity model, one or more suggested transfer amounts for the direct deposits for the first account into the second account based on one or more user characteristics associated with the user of the digital system; and
 provide the one or more additional selectable options for display within the graphical user interface of the client device by providing the one or more additional selectable options that correspond to the one or more suggested transfer amounts.

19. The system of claim 17, further comprising instructions that, when executed by the at least one processor, cause the system to:
 determine one or more suggested transfer amounts for the direct deposits for the first account into the second account based a previous direct deposit amount; and provide the one or more additional selectable options for display within the graphical user interface of the client device by providing the one or more additional selectable options that correspond to the one or more suggested transfer amounts.

20. The system of claim 15, further comprising instructions that, when executed by the at least one processor, cause the system to:
   determine a suggested transfer amount for transferring the funds associated with the first account to the second account by determining a portion of a current balance of the first account to transfer to the second account by applying a percentage value to the current balance; and
   provide the one or more selectable options for display within the graphical user interface of the client device by providing a selectable option that corresponds to the suggested transfer amount.

* * * * *